(12) United States Patent
Ström et al.

(10) Patent No.: US 9,654,803 B2
(45) Date of Patent: May 16, 2017

(54) PIXEL PRE-PROCESSING AND ENCODING

(71) Applicant: Telefonaktiebolaget LM Ericsson (publ), Stockholm (SE)

(72) Inventors: Jacob Ström, Stockholm (SE); Jonatan Samuelsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/051,488

(22) Filed: Feb. 23, 2016

(65) Prior Publication Data

US 2016/0241885 A1    Aug. 18, 2016

Related U.S. Application Data

(63) Continuation of application No. PCT/SE2016/050058, filed on Jan. 28, 2016.

(60) Provisional application No. 62/115,679, filed on Feb. 13, 2015.

(51) Int. Cl.
*H04N 19/86* (2014.01)
*H04N 19/186* (2014.01)
*H04N 19/182* (2014.01)
*G06T 3/00* (2006.01)

(52) U.S. Cl.
CPC ............. *H04N 19/86* (2014.11); *G06T 3/00* (2013.01); *H04N 19/182* (2014.11); *H04N 19/186* (2014.11)

(58) Field of Classification Search
CPC ...... H04N 19/86; H04N 19/183; H04N 9/646; H04N 19/176; H04N 19/186; G09G 2340/06; G09G 2320/0233; G09G 5/06; G06T 5/002; G06T 3/0056; G06T 2207/10024; G06T 5/20
See application file for complete search history.

(56) References Cited

U.S. PATENT DOCUMENTS

| | | | | |
|---|---|---|---|---|
| 5,450,217 A | * | 9/1995 | Eschbach | H04N 1/6027 358/518 |
| 2003/0123072 A1 | * | 7/2003 | Spronk | H04N 1/4078 358/1.9 |
| 2003/0152285 A1 | * | 8/2003 | Feldmann | G06T 7/0081 382/274 |

(Continued)

OTHER PUBLICATIONS

International Search Report and Written Opinion Corresponding to International Application No. PCT/SE2016/050058; Date of Mailing: Jun. 13, 2016; 12 Pages.

(Continued)

*Primary Examiner* — Jingge Wu
(74) *Attorney, Agent, or Firm* — Myers Bigel, P.A.

(57) ABSTRACT

A pixel pre-processing comprises obtaining an original linear luminance component value of a pixel in a picture in a third color space determined based on a linear color of the pixel in a first color space. A non-linear luma component value in a second color space is derived for the pixel based on a first non-linear chroma component value in the second color space, a second non-linear chroma component value in the second color space and the original linear luminance component value in the third color space. The pre-processing reduces luminance artifacts that otherwise may occur when chroma subsampling is used in combination with a non-linear transfer function.

25 Claims, 11 Drawing Sheets

(56) References Cited

U.S. PATENT DOCUMENTS

| | | | |
|---|---|---|---|
| 2005/0169521 A1* | 8/2005 | Hel-Or | G06T 3/4015 382/167 |
| 2005/0185837 A1* | 8/2005 | Takano | H04N 1/4072 382/162 |
| 2009/0195551 A1* | 8/2009 | Quan | G09G 5/02 345/600 |
| 2009/0278982 A1* | 11/2009 | Imai | G09G 5/02 348/453 |
| 2010/0054582 A1* | 3/2010 | Koishi | H04N 1/6033 382/162 |
| 2010/0208989 A1* | 8/2010 | Narroschke | H04N 1/646 382/166 |
| 2010/0231760 A1* | 9/2010 | Tsai | H04N 9/646 348/242 |
| 2010/0259685 A1* | 10/2010 | Isobe | H04N 9/67 348/645 |
| 2010/0289814 A1* | 11/2010 | Hsieh | G09G 3/2003 345/602 |
| 2011/0316973 A1 | 12/2011 | Miller et al. | |
| 2014/0066196 A1* | 3/2014 | Crenshaw | A63F 13/10 463/31 |

OTHER PUBLICATIONS

Strom J. et al. "Ericsson's response to CfE for HDR and WCG", ISO/IEC JTC1/SC29/WG11 MPEG2014/m36184, Feb. 2015, Geneva, Switzerland.

Thoma H. et al. "Report on the XYZ/HDR Exploratory Experiment 5 (EE5): Subsampling and its impact on coding performance and video quality", ISO/IEC JTC1/SC29/WG11 MPEG2014/M34434, Jul. 2014, Sapporo, Japan.

Stessen, J. et al. "Chromaticity based color signals", ISO/IEC JTC1/SC29/WG11 MPEG2014/M34335, Jul. 2014, Sapporo, Japan.

François et al., "About using a BT.2020 container for BT.709 content", ISO/IEC JTC1/SC29/WG11 MPEG2013/M35255, Strasbourg, France, Oct. 2014, 15 pp.

Luthra et al., "Test sequences and anchor generation for HDR and Wide Gamut Content Distribution", ISO/IEC JTC1/SC29/WG11 MPEG2014/N14548, Sapporo Japan, Jul. 2014, 14 pp.

Thoma, "On chroma subsampling for HDR video", ISO/IEC JTC1/SC29/WG11 MPEG2014/32222, San Jose, CA, Jan. 2014, 5 pp.

Textbook: "Digital Color Management, Encoding Solutions, Second Edition" by Edward J. Giorgianni and Thomas E. Madden. Wiley, 2008. ISBN 978-0-470-51244-9.

* cited by examiner

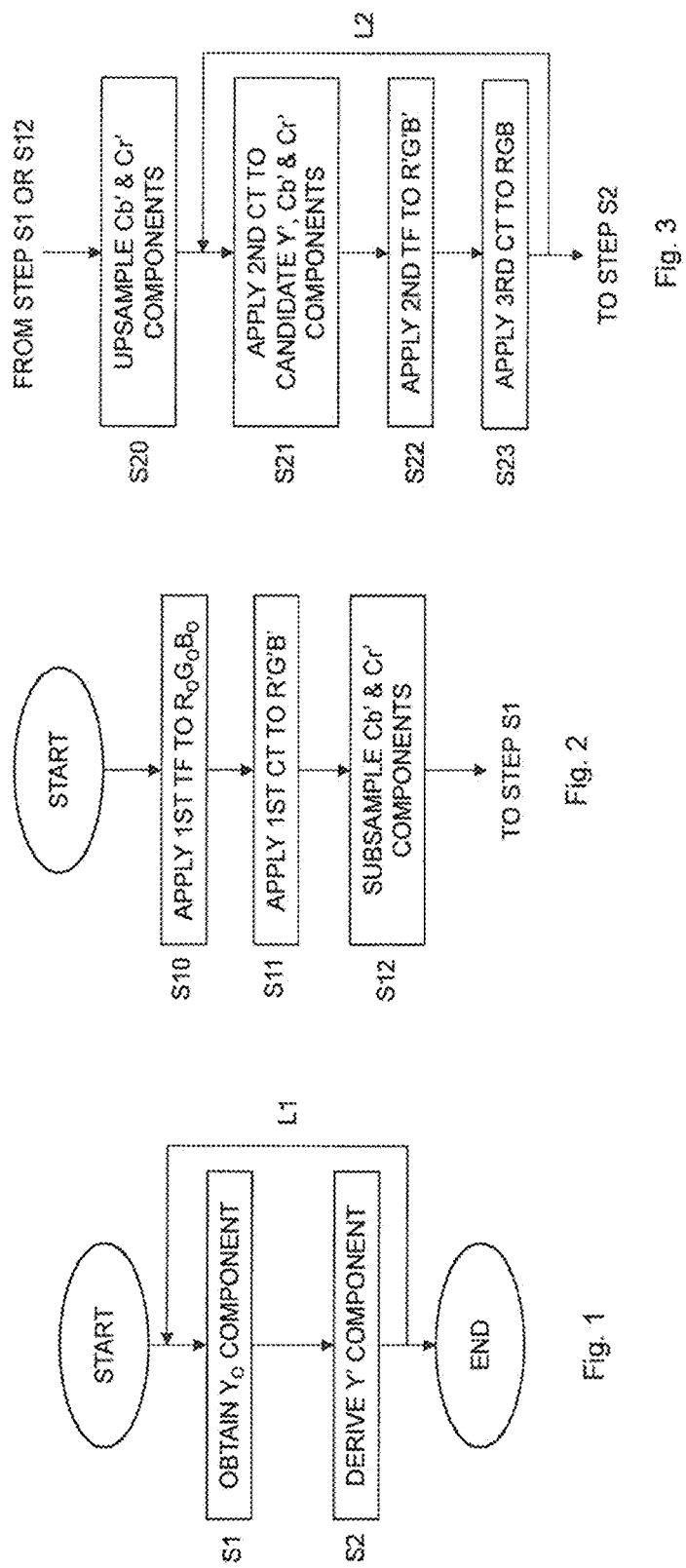

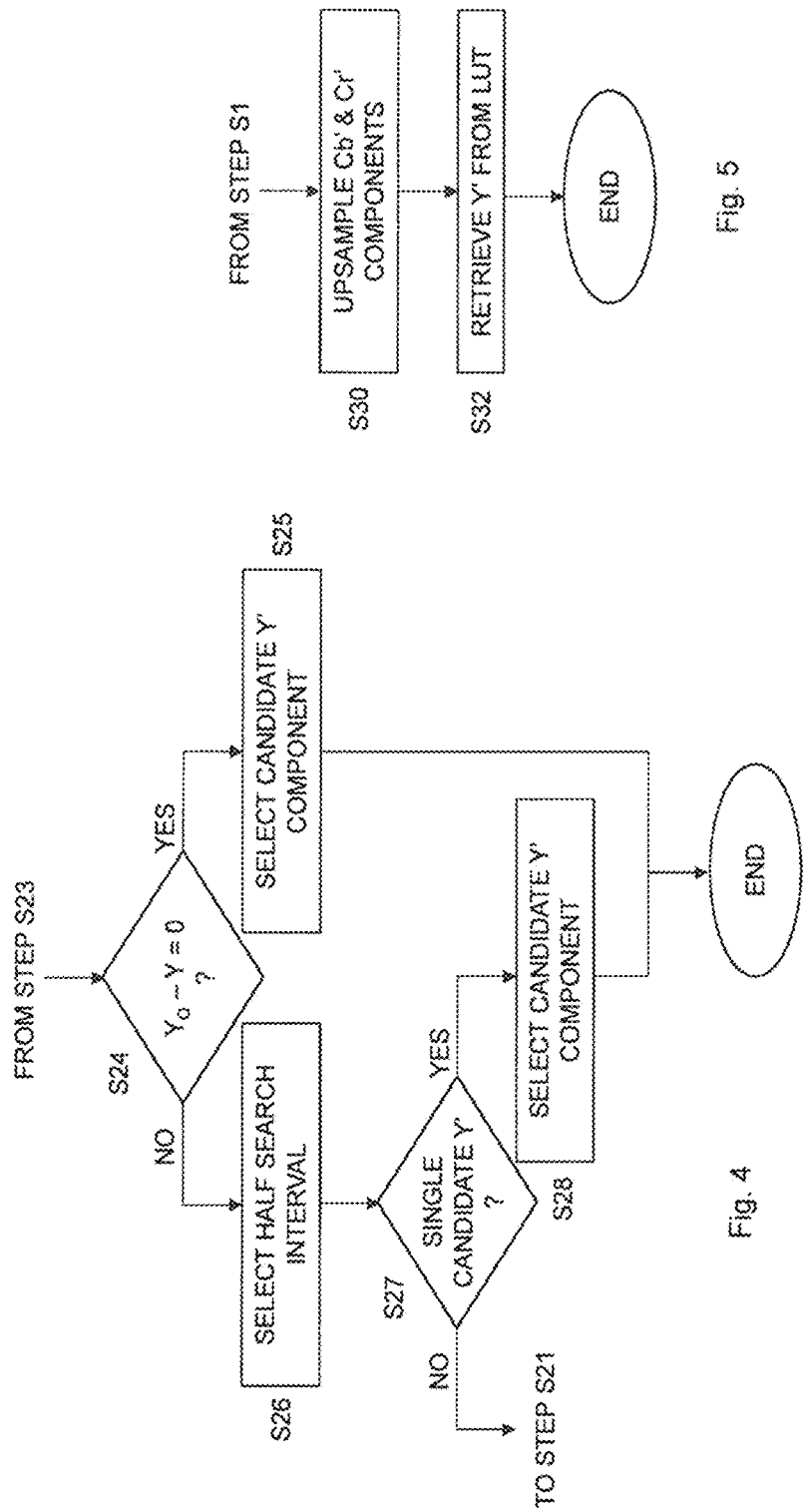

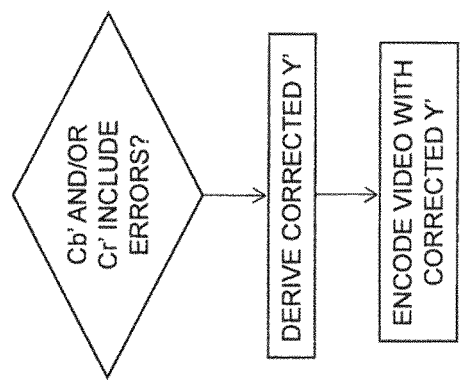
Fig. 10
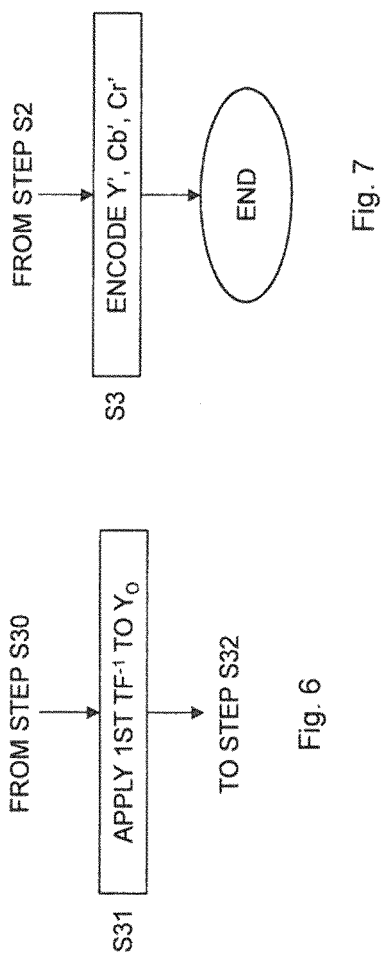
Fig. 7
Fig. 6

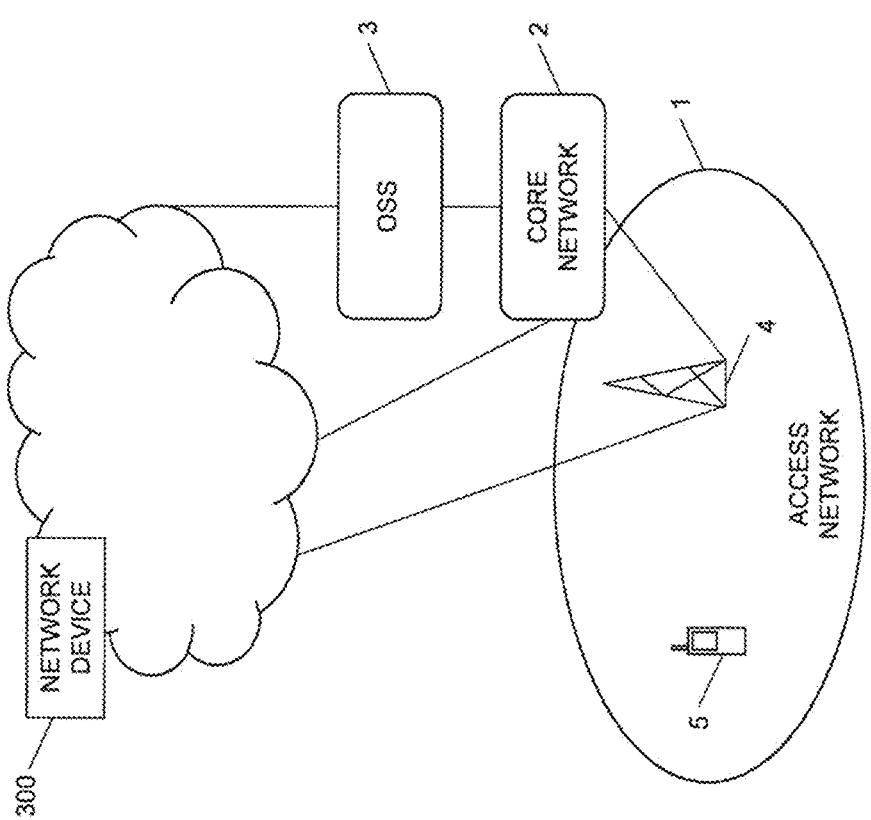

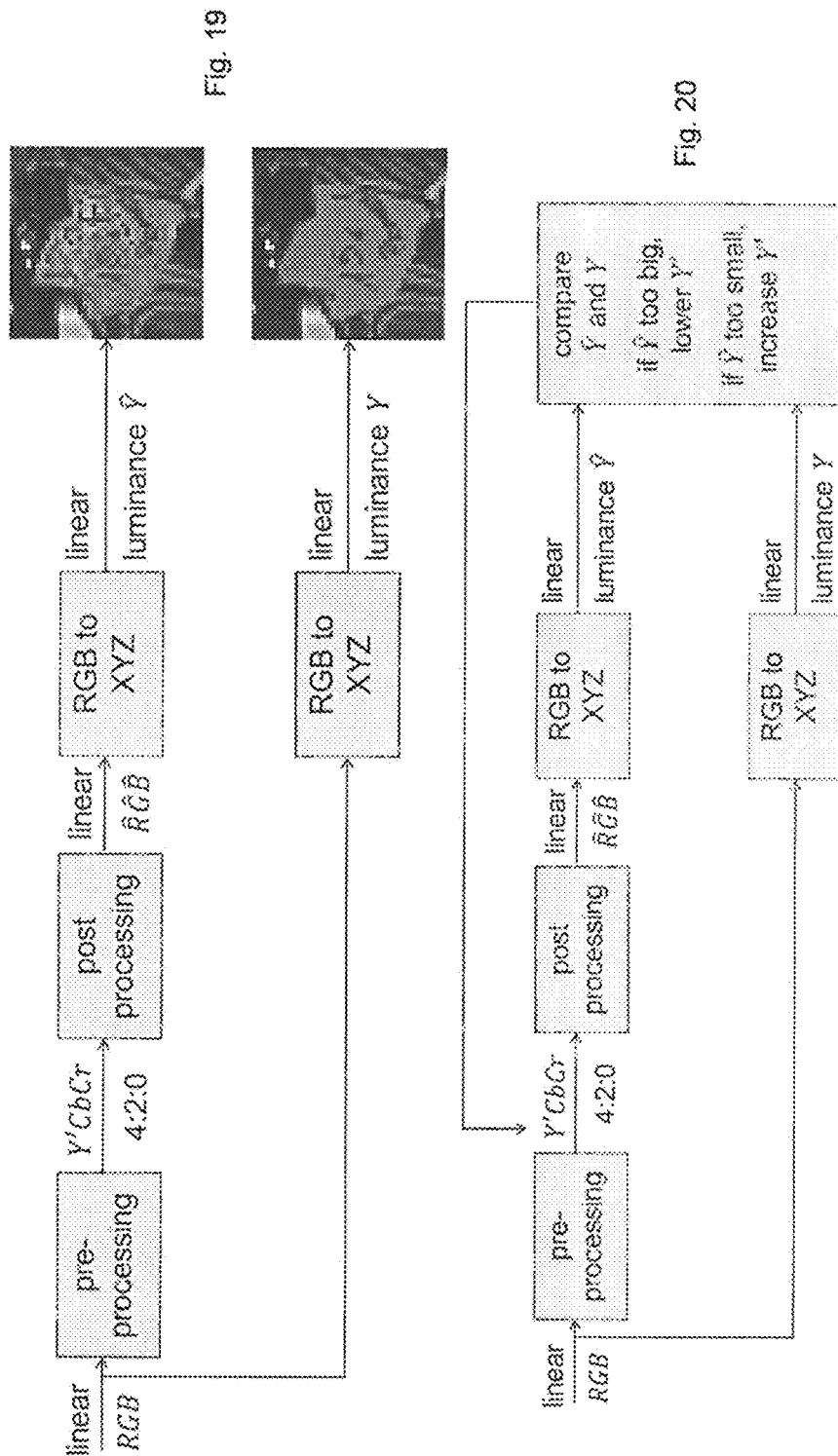

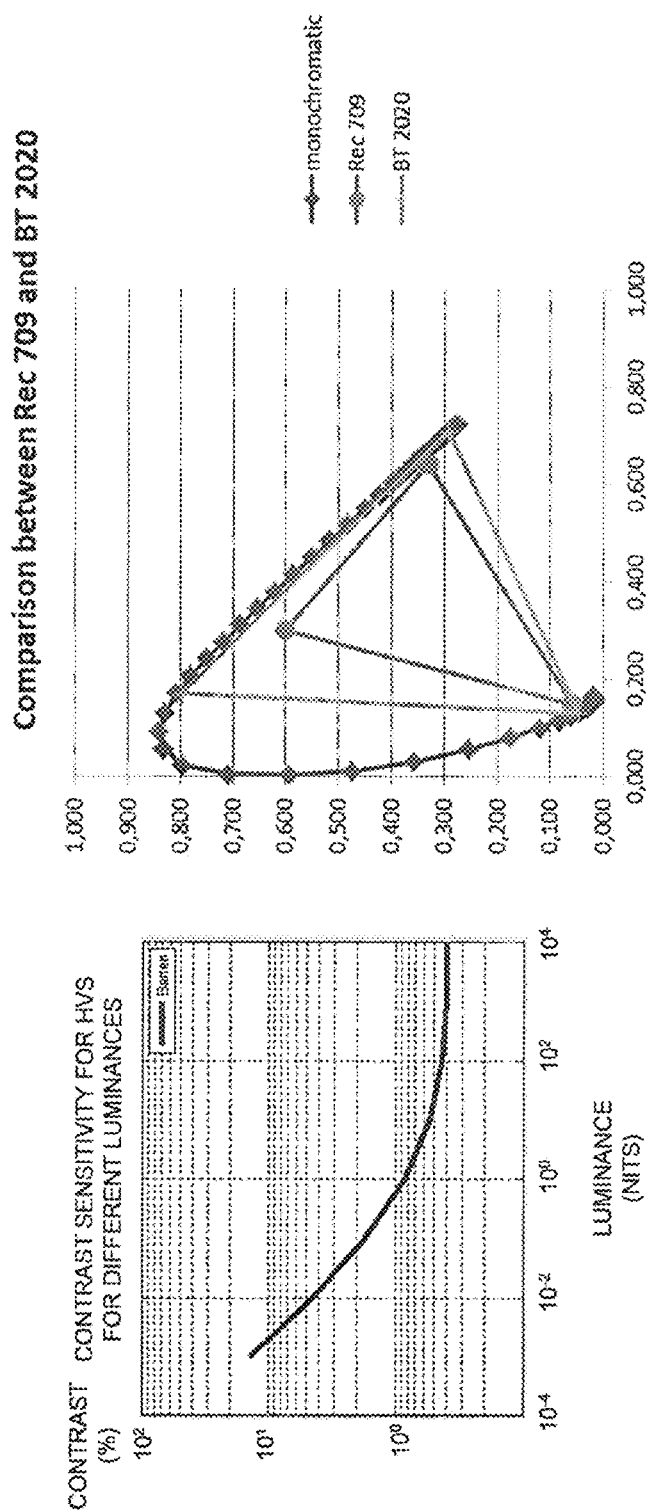

PIXEL PRE-PROCESSING AND ENCODING

CROSS REFERENCE TO RELATED APPLICATIONS

This application is a continuation of PCT International Application No. PCT/SE2016/050058, filed on Jan. 28, 2016, which itself claims priority to U.S. provisional Application No. 62/115,689, filed Feb. 13, 2015, the disclosure and content of which both of which are incorporated by reference herein in their entireties.

TECHNICAL FIELD

The present embodiments generally relate to pre-processing and encoding of pixels in a picture, and in particular to such pre-processing and encoding that improves luminance values of pixels.

BACKGROUND

In a digital video signal, each sample, i.e. pixel component, is represented by an integer or floating point value. A display, such as screen, TV or monitor, that renders the video omits optical lights based on the digital values of the video signal. The function that translates the digital value V to optical light Y is the Electro-Optical-Transfer-Function (EOTF). Traditionally the EOTF has been expressed as an exponential function called a gamma function where the gamma $\gamma$ is the exponent value. This is typically 2.4 (but can also be other values): $Y=V^\gamma$.

Using a gamma function works well for low luminance signals but when the luminance goes above 100 nits (cd/m²) the gamma function is not well aligned with the contrast sensitivity of the human visual system. Therefore transfer functions that are more non-linear are defined, e.g.:

$$Y = L_p \left( \frac{\max[(V^{1/m} - c_1), 0]}{c_2 - c_3 V^{1/m}} \right)^{1/n} \quad [1]$$

$$n = \frac{2610}{4096} \times \frac{1}{4} \approx 0.15930176$$

$$m = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

$$L_p = 10000 \frac{cd}{m^2}$$

This transfer function is more non-linear than the gamma function in the sense that the maximum value of its first derivative over the range from 0 to 1 is larger than that of the gamma function.

Chroma subsampling is typically done before compression as an initial step to reduce the amount of data. In 4:2:2 the chroma signal is reduced to half the resolution in the vertical direction. In 4:2:0 the chroma signal is reduced to half the resolution in both the vertical direction and the horizontal direction. This is typically done with some filtering operation to get a good quality signal but can also be done using nearest neighbor.

In order to display a 4:2:0 or 4:2:2 video, a decoder performs upsampling of the chroma signal, which can be done using bilinear filters or longer filters.

However, a combination of a highly non-linear transfer function, 4:2:0 or 4:2:2 subsampling and non-constant luminance ordering gives rise to severe artifacts to the video data, in particular for saturated colors, i.e. colors close to the color gamut edge.

There are several ways to get around this problem. One ways is to not use 4:2:0 or 4:2:2 subsampling, but use 4:4:4 instead. That, however, is expensive, since 4:2:0 halves the number of bits prior to compression, whereas 4:2:2 reduces the number of bits to two-thirds. Another way is to not use a highly non-linear transfer function. However, that means that it is hard to represent content of very high peak brightness without having banding in dark regions. A third way is to use constant luminance, i.e. apply the transfer function after conversion to the CIE1931 XYZ color space. However, such a solution is not aligned with common practice within the broadcasting industry and might in some scenarios be difficult and expensive to realize.

SUMMARY

It is a general objective to provide a pre-processing of pixels to combat artifacts.

These and other objectives are met by embodiments as disclosed herein.

An aspect of the embodiments relates to a method of pre-processing a pixel in a picture. The method comprises obtaining an original linear luminance component value of the pixel in a third color space determined based on a linear color of the pixel in a first color space. The method also comprises deriving a non-linear luma component value in a second color space for the pixel based on a first non-linear chroma component value in the second color space, a second non-linear chroma component value in the second color space and the original linear luminance component value in the third color space.

Another aspect of the embodiments relates to a device for pre-processing a pixel in a picture. The device is configured to obtain an original linear luminance component value of the pixel in a third color space determined based on a linear color of the pixel in a first color space. The device is also configured to derive a non-linear luma component value in a second color space for the pixel based on a first non-linear chroma component value in the second color space, a second non-linear chroma component value in the second color space and the original linear luminance component value in the third color space.

A related aspect of the embodiments defines a device for pre-processing a pixel in a picture. The device comprises a determining unit for obtaining an original linear luminance component value of the pixel in a third color space determined based on a linear color of the pixel in a first color space. The device also comprises a deriver for deriving a non-linear luma component value in a second color space for the pixel based on a first non-linear chroma component value in the second color space, a second non-linear chroma component value in the second color space and the original linear luminance component value in the third color space.

A further aspect of the embodiments relates to a device for encoding a pixel in a picture. The device comprises a processor and a memory comprising instructions executable by the processor. The processor is operative to obtain an original linear luminance component value of the pixel in a third color space determined based on a linear color of the pixel in a first color space. The processor is also operative to derive a non-linear luma component value in a second color space for the pixel based on a first non-linear chroma component value in the second color space, a second non-linear chroma component value in the second color space and the original linear luminance component value in the third color space. The processor is further operative to encode the non-linear luma component value, the first non-linear chroma component value and the second non-linear chroma component value.

A related aspect of the embodiments defines a device for encoding a pixel in a picture. The device comprises a determining unit for obtaining an original linear luminance component value of the pixel in a third color space determined based on a linear color of the pixel in a first color space. The device also comprises a deriver for deriving a non-linear luma component value in a second color space for the pixel based on a first non-linear chroma component value in the second color space, a second non-linear chroma component value in the second color space and the original linear luminance component value in the third color space. The device further comprises an encoder for encoding the non-linear luma component value, the first non-linear chroma component value and the second non-linear chroma component value.

Yet another aspect of the embodiments relates to a computer program comprising instructions, which when executed by a processor, cause the processor to obtain an original linear luminance component value of a pixel in a picture in a third color space determined based on a linear color of the pixel in a first color space. The processor is also caused to derive a non-linear luma component value in a second color space for the pixel based on a first non-linear chroma component value in the second color space, a second non-linear chroma component value in the second color space and the original linear luminance component value in the third color space.

A related aspect of the embodiments defines a carrier comprising a computer program according to above. The carrier is one of an electronic signal, an optical signal, an electromagnetic signal, a magnetic signal, an electric signal, a radio signal, a microwave signal, or a computer-readable storage medium.

A further aspect of the embodiments relates to a signal representing an encoded version of a pixel in a picture. The encoded version comprises an encoded version of a subsampled first non-linear chroma component value in a second color format, an encoded version of a subsampled second non-linear chroma component value in the second color space and an encoded version of a non-linear luma component value in the second color format derived according to above.

The present embodiments provide a pixel pre-processing and encoding that combats artifacts that otherwise may occur due to usage of a non-linear transfer function in combination with chroma subsampling. Subjectively, the quality improvement in luminance is clearly visible even for uncompressed video.

BRIEF DESCRIPTION OF THE DRAWINGS

The embodiments, together with further objects and advantages thereof, may best be understood by making reference to the following description taken together with the accompanying drawings, in which:

FIG. 1 is a flow chart illustrating a method of pre-processing a pixel according to an embodiment;

FIG. 2 is a flow chart illustrating additional, optional steps of the method shown in FIG. 1 according to an embodiment;

FIG. 3 is a flow chart illustrating additional, optional steps of the method shown in FIG. 1 according to another embodiment;

FIG. 4 is a flow chart illustrating additional, optional steps of the method shown in FIG. 3 according to an embodiment;

FIG. 5 is a flow chart illustrating an embodiment of implementing the deriving step in FIG. 1;

FIG. 6 is a flow chart illustrating an additional, optional step of the method shown in FIG. 5 according to an embodiment;

FIG. 7 is a flow chart illustrating an additional step of the method shown in FIG. 1 to form a method of encoding a pixel according to an embodiment;

FIG. 10 is a flow chart illustrating a method that can be performed in an encoder or in a pre-process to the encoder;

FIG. 16 is a schematic illustration of an example of a wireless communication system with one or more cloud-based network devices according to an embodiment;

FIG. 19 illustrates that the linear luminance, the Y in CIE1931 XYZ space, is quite different in the original picture (bottom) and the processed picture (top);

FIG. 20 illustrates a technology that by changing the Y' value in an individual pixel, it is possible to reach a linear luminance $\hat{Y}$ that matches the desired linear luminance Y;

FIG. 21 illustrates Barten's curve for contrast sensitivity; and

FIG. 22 illustrates a comparison between Rec709 and BT.2020 color gamuts.

DETAILED DESCRIPTION

Figure 8:
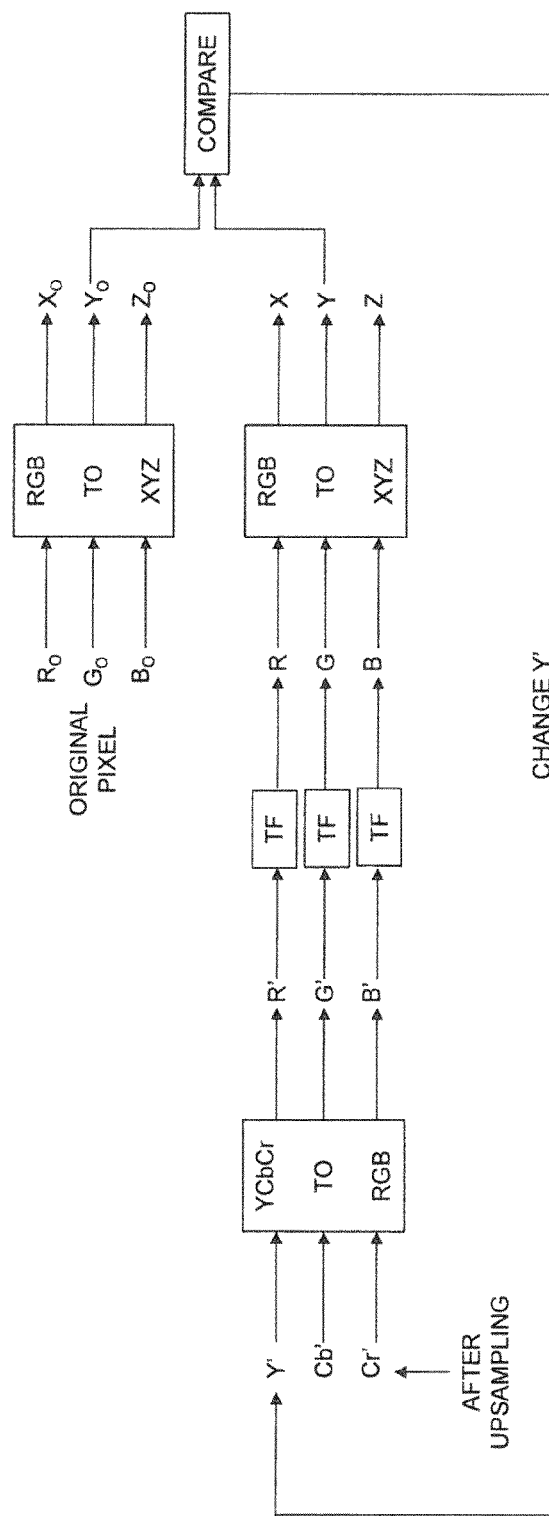
FIG. 8 illustrates a technology of deriving a corrected Y' according to an embodiment.

Throughout the drawings, the same reference numbers are used for similar or corresponding elements.

The present embodiments generally relate to pre-processing and encoding of pixels in a picture, and in particular to such pre-processing and encoding that improves luminance values of pixels.

A traditional compression chain involves feeding pixels of incoming linear light, typically ranging from 0 to 10,000 cd/m², to an inverse transfer function, which results in new pixel values between 0 and 1. After this, the pixels undergo color transform resulting in a luma component and two chroma components. Then the two chroma components are subsampled, such as to 4:2:0 or 4:2:2. After decompression, the 4:2:0 or 4:2:2 sequences are upsampled to 4:4:4, inverse color transformed and finally a transfer function gives back pixels of linear light that can be output on a monitor.

A combination of a highly non-linear transfer function, chroma subsampling and non-constant luminance ordering gives rise to severe artifacts to the video data, in particular for saturated colors. The trouble comes from the fact that the chroma components are interpolated, whereas the luma component is not. Hence, there can be sharp shift in the luma component in a pixel but the chroma components cannot follow since they are interpolated. For some colors, especially saturated colors, the result is a pixel of completely wrong intensity, which is clearly visible as an artifact.

The pre-processing of pixels according to the embodiments can be used to combat or at least reduce the impact of artifacts, thereby resulting in a color that is closer to the incoming "true" color of a pixel.

A color space or color format is the type and number of colors that originate from the combinations of color components of a color model. A color model is an abstract configuration describing the way colors can be represented as tuples of numbers, i.e. color components. The color components have several distinguishing features such as the component type, e.g. hue, and its unit, e.g. degrees or percentage, or the type of scale, e.g. linear or non-linear, and its intended number of values referred to as the color depth or bit depth.

Non-limiting, but illustrative, color spaces that are commonly used for pixels in pictures and videos include the red, green, blue (RGB) color space, the luma, chroma blue and chroma red (YCbCr, sometimes denoted Y'CbCr, Y'Cb'Cr', YCBCR, Y'CBCR or Y'CB'CR) color space and the luminance and chrominances (XYZ) color space.

FIG. 1 is a flow chart illustrating a method of pre-processing a pixel in a picture. The method comprises obtaining, in step S1, an original linear luminance component value of the pixel in a third color space determined based on a linear color of the pixel in a first color space. The method then continues to step S2, which comprises deriving a non-linear luma component value in a second color space for the pixel based on a first non-linear chroma component value in the second color space, a second non-linear chroma component value in the second color space and the original linear luminance component value in the third color space.

The pixel pre-processing in FIG. 1 employs two non-linear chroma components in the second color space. The two non-linear chroma components in the second color space could be a subsampled first non-linear chroma component value in the second color space and a subsampled second non-linear chroma component value in the second color space. In a particular embodiment, these two non-linear chroma components are the Cb' and Cr' components. More preferably, the non-linear chroma components are Cb' and Cr' components in the 4:2:0 or 4:2:2 format. Accordingly, the second color space is, in this embodiment, the YCbCr color space. The apostrophe "'" is used to indicate that the two chroma components are non-linear chroma components.

In such a case, step S2 of FIG. 1 preferably comprises deriving the non-linear luma component value in the second color space based on a subsampled first non-linear chroma component value in the second color space, a subsampled second non-linear chroma component value in the second color space and the original linear luminance component value in the third color space.

In an alternative embodiment, the two non-linear chroma component values in the second color space do not necessarily have to be subsampled but could rather be in the form of non-sampled non-linear chroma component values in the second color space or upsampled non-linear chroma component values in the second color space. In the latter case, the upsampled non-linear chroma component values are obtained following upsampling of the subsampled non-linear chroma component values in the second color space. In this alternative embodiment, the non-linear chroma components are Cb' and Cr' components in the 4:4:4 format.

In an embodiment, the first and second non-linear chroma component values in the second color space of the pixel are obtained based on the linear color of the pixel in the first color space. In a particular embodiment, this first linear color space is the RGB color space. Accordingly, the linear color of the pixel in the first color space is, in this particular embodiment, a RGB color of the pixel.

In an embodiment, the third color space mentioned above is the XYZ color space. Accordingly, the linear luminance of the pixel in the third color space is, in this embodiment, a Y component.

The pre-processing in FIG. 1, thus, obtains or provides an original linear luminance component value of the pixel in the third color space determined based on a linear color of the pixel in the first color space. This original linear luminance component value preferably reflects the true luminance of the pixel, i.e. the original luminance of the pixel prior to any color transformation, application of transfer functions and subsampling. This original linear luminance component value is determined based on the linear color of the pixel in the first color space. In an embodiment, this linear color of the pixel in the first color space is the original incoming color of the pixel. In a particular embodiment, this original incoming color is denoted $R_O G_O B_O$ herein and the original linear luminance component is denoted $Y_O$.

The original linear luminance is, thus, the target luminance which could be calculated in many different ways. This original linear luminance does not necessarily have to correspond directly to the actual luminance of the sensor in the camera taking a picture or recording a video or in the panel of the display.

The original linear luminance component value in the third color space could be obtained to the pre-processing and encoding functionality as an original linear luminance component value, preferably $Y_O$ value, in a pre-determined or pre-calculated form. This means that the determination of the original linear luminance component value based on the linear color in the first color space has already taken place and only the result of the determination is provided to the pre-processing and encoding functionality.

In an alternative embodiment, the pre-processing of the embodiments comprises determination or calculation of the original linear luminance component value. In such an embodiment, step S1 of FIG. 1 preferably comprises determining the original linear luminance component value in the third color space based on the linear color in the first color space.

The non-linear luma component value in the second color space is then derived for the pixel in step S2 based on the first and second non-linear chroma component values in the second color space and the original linear luminance component value in the third color space. Hence, in an embodiment, the non-linear luma component Y' in the YCbCr color space is a function of the Cb' and Cr' components in the YCbCr color space and the $Y_O$ component in the XYZ color space, i.e. Y'=f(Cb', Cr', $Y_O$). The $Y_O$ component is in turn determined based on the $R_O G_O B_O$ color of the pixel in the RGB color space, i.e. $Y_O$=g($R_O$, $G_O$, $B_O$). Accordingly, Y'=f(Cb', Cr', g($R_O$, $G_O$, $B_O$)).

The pre-processed pixel is then represented by the derived non-linear luma component (Y') and the two subsampled non-linear chroma components (Cb', Cr') in the second color space, i.e. Y'Cb'Cr'. Thus, the tuple Y'Cb'Cr' represents the pre-processed color of the pixel, preferably in the 4:2:0 or 4:2:2 format, i.e. with subsampled chroma components but non-subsampled luma component.

In an embodiment, step S2 of FIG. 1 comprises deriving a non-linear luma component value in the second color space that minimizes a difference between the original linear luminance component value in the third color space and a linear luminance component value in the third color space determined based on the non-linear luma component value in the second color space, the first non-linear chroma component value in the second color space and the second non-linear chroma component value in the second color space.

Hence, in this embodiment, step S2 involves finding the non-linear luma component (Y') value in the second color space (YCbCr) that minimizes the difference between the original linear luminance component ($Y_O$) value and the linear luminance component (Y) value in the third color space (XYZ). This linear luminance component (Y) value in third color space (XYZ) is in turn obtained based on the non-linear luma component (Y') value and the two non-linear chroma component (Cb', Cr') values in the second color space (YCbCr).

Thus, this embodiment involves finding the Y' component value that minimizes the difference $|Y_O - Y|$ or $(Y_O - Y)^2$, wherein Y=h(Y', Cb', Cr') and h(.) defines that Y is determined based on Y', Cb' and Cr'.

In an alternative but related embodiment, step S2 involves deriving a non-linear luma component value in the second color space that minimizes a difference between a function of the original luminance component value in the third color space and a function of a linear luminance component value in the third color space. This linear luminance component value in the third color space is determined based on the non-linear luma component value in the second color space, the first non-linear chroma component value in the second color space and the second non-linear chroma component value in the second color space.

Thus, this embodiment involves finding the Y' component value that minimizes the difference $|k(Y_O) - k(Y)|$ or $(k(Y_O) - k(Y))^2$, wherein Y=h(Y', Cb', Cr').

The function (k(.)) is preferably an inverse transfer function, such as the inverse of the transfer function [1].

The method steps S1 and S2 of FIG. 1 are performed for at least one pixel in a picture, such as of a video sequence. In an embodiment, steps S1 and S2 are preferably performed for multiple, i.e. at least two, pixels in the pictures, which is schematically indicated by the line L1. In a particular embodiment, steps S1 and S2 are performed for all pixels in the picture.

In another particular embodiment, steps S1 and S2 are performed for those pixels in the picture that result in a visual artifact as previously described herein. These pixels could be identified by comparing the original linear luminance component ($Y_O$) value in the third color space for the pixel with a linear luminance component (Y) value in the third color space determined for the pixel based on non-linear luma and chroma component (Y', Cb', Cr') values in the second color format and where these non-linear luma and chroma component values are derived according to the typical compression chain without any pre-processing according to the invention. In this latter embodiment, the pre-processing of the embodiments is thereby only applied to those pixels in a picture at which the typical compression chain results in an error in the luma component.

Alternatively, the pixels in the picture that result in visual artifacts could be identified by comparing the Cb' and Cb component values and/or the Cr' and Cr component values, i.e. the upsampled Cb' and/or Cr' component value with the corresponding Cb and/or Cr' component value obtained by applying the first color transform to the R'G'B' color, where R', G' and B' are obtained by applying the inverse transfer function to $R_O$, $G_O$ and $B_O$, respectively, of the original $R_O G_O B_O$ color.

A further variant is to perform steps S1 and S2 for those pixels that have saturated colors, i.e. colors at or close to the gamut edge.

FIG. 2 is a flow chart illustrating additional, optional steps of the method shown in FIG. 1. The steps of FIG. 2 illustrate the typical processing chain used to derive the subsampled non-linear chroma component values in the second color space based on the linear color in the first color space. The method starts in step S10, which comprises applying a first transfer function to the linear color in the first color space to get a non-linear color in the first color space. A next step S11 comprises applying a first color transform to the non-linear color in the first color space to get a non-linear color in the second color space. The non-linear color in the second color space comprises an initial first non-linear chroma component value and an initial second non-linear chroma component value. The following step S12 comprises subsampling the initial first non-linear chroma component value in the second color space and the initial second non-linear chroma component value in the second color space to get the subsampled first non-linear chroma component value in the second color space and the subsampled second non-linear chroma component value in the second color space. The method then continues to step S1 in FIG. 1.

In an embodiment of the typical processing chain of FIG. 2, a first transfer function, such as the inverse of the transfer function [1], is applied to the $R_O G_O B_O$ color of the pixel, i.e. the original color of the pixel, to get a non-linear color R'G'B' in the RGB color space. This R'G'B' color is then color transformed from the RGB color space to the YCbCr color space using a first color transform, such as the color transform:

$$Y = 0.299R + 0.587G + 0.114B$$

$$Cb = -0.168736R - 0.331264G + 0.5B$$

$$Cr = 0.5R - 0.418688G - 0.081312B$$

The resulting Y'Cb'Cr' color of the pixel following the application of the first color transform in step S11 is a non-compressed Y'Cb'Cr' color, i.e. in the 4:4:4 format. The following step S12 subsamples the two chroma components Cb' and Cr' to get a color in the 4:2:0 or 4:2:2 format, i.e. with subsampled non-linear chroma components Cb' and Cr'.

Subsampling in step S12 can be performed according to known subsampling techniques. For instance, a filtering operation or a nearest neighbor operation can be used. An example of subsampling technique that can be used according to the embodiments is disclosed in section B.1.5.5 Chroma downsampling from 4:4:4 to 4:2:0 in document [4].

FIG. 3 is a flow chart illustrating additional, optional steps of the method shown in FIG. 1. These steps illustrate additional processing in order to derive an optimal non-linear luma component value for a pixel in a picture. The method continues from step S1 in FIG. 1 or step S12 in FIG. 2. The method continues by upsampling the subsampled first non-linear chroma component value in the second color space and the subsampled second non-linear chroma component value in the second color space to get an upsampled first non-linear chroma component value in the second color space and an upsampled second non-linear chroma component value in the second color space in step S20. A next step S21 comprises applying a second color transform to a candidate non-linear luma component value in the second color space, the upsampled first non-linear chroma component value in the second color space and the upsampled second non-linear chroma component value in the second color space to get a non-linear color in the first color space. The next step S22 comprises applying a second transfer function to the non-linear color in the second color space to get a linear color in the first color space. Finally, a third color transform is applied in step S23 to the linear color in the first color space to get a linear luminance component value in the third color space. The method then continues to step S2 in FIG. 1, which comprises deriving the non-linear luma component value based on a comparison of the original linear luminance component value in the third color space and the linear luminance component value in the third color space.

Thus, in an embodiment, the subsampled Cb' and Cr' component values in 4:2:0 or 4:2:2 format are first upsampled to the 4:4:4 format. Upsampling in step S20 can be performed according to known upsampling techniques. For instance, upsampling could be performed by using bilinear or longer filters. An example of upsampling technique that can be used according to the embodiments is disclosed in section B.1.5.6 Chroma upsampling from 4:2:0 to 4:4:4 (Y'CbCr domain) in document [4].

These two upsampled Cb' and Cr' component values are then input together with a candidate Y' component value into a second color transform to get a non-linear R'G'B' color, such as the color transform:

$$R'=Y'+a13Cr'$$

$$G'=Y-a22b'-a23Cr'$$

$$B'=Y+a32Cb'$$

For Rec.709 color space a13=1.57480, a22=0.18732, a23=0.46812, a32=1.85560 and for BT.2020 color space a13=1.47460, a22=0.16455, a23=0.57135, a32=1.88140.

Generally, R', G' and B' can assume values within the interval [0, 1]. Accordingly, the second color transform may also include a clamping or clipping operation, such as R'=clip(Y'+a13Cr', 0, 1) for the R' component, wherein clip(x, a, b) is equal to a if x<a and equal to b if x>b and otherwise equal to x.

This R'G'B' color is then input into a second transfer function, such as the transfer function [1], to get a linear RGB color. This RGB color is then transformed from the RGB color space to the XYZ color space using a third color transform, such as the color transform:

$$X=0.636958R+0.144617G+0.168881B$$

$$Y=0.262700R+0.677998G+0.059302B$$

$$Z=0.000000R+0.028073G+1.060985B$$

The linear luminance component Y value output form the third color transform is then compared to the original linear luminance component $Y_O$ value of the pixel in step S2.

In an embodiment, step S2 of FIG. 1 comprises selecting a candidate non-linear luma component value in the second color space that reduces a difference between the original linear luminance component value in the third color space and the linear luminance component value in the third color space.

Thus, step S2 preferably comprises selecting a candidate non-linear luma component value in the second color space that leads to at least a reduction in the difference between the original linear luminance component value and the linear luminance component value obtained in step S23. In a particular embodiment, step S2 comprises selecting a candidate non-linear luma component value in the second color space that minimizes the difference between the original luminance component value and the linear luminance component value in the third color space.

This difference could, as mentioned in the foregoing, be represented as $|Y_O-Y|$ or $(Y_O-Y)^2$, wherein Y is obtained in step S23 of FIG. 3.

In an alternative but related embodiment, step S2 involves selecting a candidate non-linear luma component value in the second color space that reduces or, preferably, minimizes a difference between a function of the original luminance component value in the third color space and a function of the linear luminance component value in the third color space, i.e. selecting the candidate Y' component value that minimizes the difference $|k(Y_O)-k(Y)|$ or $(k(Y_O)-k(Y))^2$.

In an embodiment, steps S21 to S23 in FIG. 3 are performed for different candidate non-linear luma component values in the second color space, which is schematically illustrated by the line L2. In such a case, step S2 preferably comprises selecting the candidate non-linear luma component value among the different candidate non-linear luma component values in the second color space that results in a smallest difference between the original linear luminance component value in the third color space and the linear luminance component value in the third color space or a smallest difference between a function of the original linear luminance component value in the third color space and a function of the linear luminance component value in the third color space.

This means that the loop of steps S21 to S23 are performed multiple times and using different candidate Y' component values in step S21. The candidate Y' component value that then lead to the smallest difference between $Y_O$ and Y or between $k(Y_O)$ and $k(Y)$ is then selected and used together with the subsampled Cb' and Cr' component values as color representation of the pixel.

The following embodiments are described in more detail with regard to a difference between the original linear luminance component value in the third color space and the linear luminance component value in the third color space. These embodiments also encompass a difference between a function of the original linear luminance component value in the third color space and a function of the linear luminance component value in the third color space. The function is preferably, as previously mentioned herein, the inverse of a transfer function, such as an inverse of the transfer function [1].

The selection of the optimal candidate Y' component value among multiple candidate Y' component values can be performed according to various embodiments as described further herein.

A first embodiment involves performing a binary search. Hence, in this embodiment the method comprises performing a binary search to select a candidate non-linear luma component value in the second color space that minimizes a difference between the original linear luminance component value in the third color space and the linear luminance component value in the third color space.

A binary search is an efficient technique that can be used to find the optimal candidate non-linear luma component value. Generally, a binary search algorithm begins by comparing the original luminance component value in the third color space to the linear luminance component value in the third color space obtained using the middle element of a sorted array of possible candidate non-linear luma component values in the second color space. If the linear luminance component value in the third color space is equal to the original luminance component value in the third color space or differs from the original luminance component value in the third color space with not more than a defined amount, then the position of the middle element is returned and the search is finished. If the linear luminance component value is greater than the original linear luminance component value, then the search continues on the lower half of the array; or if the linear luminance component value is less than the original linear luminance component value, then the search continues on the upper half of the array. This process continues, eliminating half of the elements, and comparing the resulting linear luminance component value to the original linear luminance component value, until the difference there between is zero or until the entire array has been searched, i.e. until all elements except one has been eliminated. This is guaranteed to only take $\log_2(N)$ steps, where N is the number of possible candidate non-linear luma component values in the array. For instance, assume that the candidate non-linear luma component values can be selected from the array of [0, 1023]. Then N=1024 and $\log_2(1024)$= 10.

In an embodiment, the binary search is performed by performing steps S21 to S23 in FIG. 3 for a candidate non-linear luma component value in the second color space in the middle of a search interval. The method then continues to the steps illustrated in FIG. 4. A following step S25 comprises selecting the candidate non-linear luma component value in the middle of the search interval if the difference between the original luminance component value in the third color space and the linear luminance component value in the third color space is equal to zero, preferably as calculated in step S24. Otherwise, i.e. if the difference calculated in step S24 is not equal to zero, the method continues to step S26. This step S26 comprises selecting a search interval having half the size as compared to the search interval used above and ending at the candidate non-linear luma component value used above if the linear luminance component value in the third color space is larger than the original linear luminance component value in the third color space or selecting a search interval having half the size as compared to the search interval used above and starting at the candidate non-linear luma component value used above if the linear luminance component value in the third color space is smaller than the original linear luminance component value in the third color space.

The steps involving the loop L2, i.e. steps S21-S23, and S24-S26 are then repeated until the difference between the original linear luminance component value in the third color space and the linear luminance component value in the third color space is equal to zero, the search interval cannot be halved any more, the loop has been repeated a defined number of times or the search interval has reached a predefined interval size, i.e. the search interval is smaller than or equal to the predefined interval size.

The selection of a search interval in step S26 generally involves selecting a search interval having approximately half the size as compared to the search interval used above. For instance, if the search interval contains the values 100, 101, 102, 103 then one could choose either 101 or 102 as the "middle value", resulting in a "halved" search interval of [100, 101] (a true halving of the search interval) or [101, 103] (an approximate halving of the search interval) or a "halved" search interval of [100, 102] (an approximate halving of the search interval) or [102, 103] (a true halving of the search interval).

Another embodiment is to regard the selection of non-linear luma component value as an optimization problem and minimizes the error $E=(Y_O-Y)^2$ or $E=|Y_O-Y|$ with regard to Y'. This can be done, for instance, by gradient descent, by calculating the gradient of E with respect to Y', i.e. dE/dY', and update Y' a small amount in the opposite direction of the gradient, i.e. $Y'_{n+1}=Y'_n-\alpha(dE/dY')$, where $\alpha$ is a small constant.

Gradient descent can be slow, so a quicker way may be to use a second-order optimization algorithm that calculates or approximates the second order derivatives $d^2E/dY'^2$. Gauss-Newton is an example of such an algorithm.

A further embodiment involves using a look-up table (LUT) when selecting the non-linear luma component value. Such a LUT may, for instance, comprise the best Y' component value for every possible combination of Cb', Cr' and $Y_O$ component values. Assume, for instance, that the Cb' and Cr' components are quantized to 10 bits and that the $Y_O$ component is also quantized to 10 bits. Then the LUT should contain $2^{10} \times 2^{10} \times 2^{10}$ different Y' component values. This is equivalent to $2^{30}$ Y' component values. If each such Y' component value is two bytes, the LUT will have a size of $2^{31}$ bytes, or 2 Gb.

It may also be possible to use a smaller LUT. For instance, it may be possible to quantize the $Y_O$, Cb' and Cr' components to a smaller size, say 6 bits. Then the LUT would be $2^{18}$ Y' component values, or $2^{19}$ bytes, which is equal to 512 kb.

The $Y_O$ component is linear. Accordingly, it may be inefficient to just quantize it. It may instead be better to use a function of $Y_O$ together with the Cb' and Cr' as input to the LUT to get the optimal Y' component. The function preferably outputs a non-linear representation of the $Y_O$ component and may, for instance, be an inverse transfer function (TF-1(.)), such as the inverse of the transfer function [1]. The optimal Y' component value is then derived from the LUT as Y'=LUT(Cb', Cr', $TF^{-1}(Y_O)$).

FIG. 5 is a flow chart illustrating an embodiment of step S2 in FIG. 1 when using a LUT. The method continues from step S1 in FIG. 1. A next step S30 comprises upsampling the subsampled first non-linear chroma component value in the second color space and the subsampled second non-linear chroma component value in the second color space to get an upsampled first non-linear chroma component value in the second color space and an upsampled second non-linear chroma component value in the second color space.

The next step S32 comprises retrieving the non-linear luma component value in the second color space from a look-up table using the original linear luminance component value in the third color space, or a non-linear version thereof, the upsampled first non-linear chroma component value in the second color space and the upsampled second non-linear chroma component value in the second color space, or quantized versions thereof, as input to the look-up table.

FIG. 6 is a flow chart illustrating an additional, optional step of the method shown in FIG. 5. The method continues from step S30 in FIG. 5. A next step S31 comprises applying the first inverse transfer function to the original linear luminance component value in the third color space to get an original non-linear luminance component value in the third color space. The method then continues to step S32 in FIG. 5. In this embodiment, step S32 comprises retrieving the non-linear component value in the second color space from the look-up table using the original non-linear luminance component value in the third color space, the upsampled first non-linear chroma component value in the second color space and the upsampled second non-linear chroma component value in the second color space, or the quantized versions thereof, as input to the look-up table.

In an embodiment, the look-up table comprises, for each combination of the original linear luminance component value in the third color space, or the non-linear version thereof, the upsampled first non-linear chroma component value in the second color space and the upsampled second non-linear chroma component value in the second color space, or the quantized versions thereof, an optimal non-linear luma component value in the second color space that minimizes a difference between the original linear luminance component value in the third color space and a linear luminance component value in the third color space determined based on the optimal non-linear luma component value in the second color space, the subsampled first non-linear chroma component value in the second color space and the subsampled second non-linear chroma component value in the second color space.

The upsampling of the non-linear chroma component values in the second color space as performed in step S20 in FIG. 3 and step S5 in FIG. 5 preferably upsamples the non-linear chroma component values to a same number of samples as the non-linear luma component value in the second space. Thus, the upsampling as performed in these steps preferably results in non-linear chroma component values having the same number of samples as prior to application of any subsampling, such as in step S12 in FIG. 2. This means that prior to subsampling and following upsampling the Y', Cb' and Cr' components all comprise the same number of samples, such as in the 4:4:4 format. Following the subsampling the Y' component comprises more samples as compared to the Cb' and Cr' components, which preferably comprise the same number of samples, such as in the 4:2:0 or 4:2:2 format.

A pixel in a picture has non-linear luma component value in the second color space preferably derived as described herein. The non-linear chroma component values in the second color space associated with the pixel and obtained following upsampling can be generated based on a respective subsampled first and second non-linear chroma component value in the second color space or based on multiple subsampled first and second non-linear chroma component values in the second color space, depending on the upsampling technique. For instance, if bilinear upsampling is used, then four subsampled Cb' component values and four subsampled Cr' component values will affect the pixel and the values of the upsampled Cb' and Cr' components. Correspondingly, if nearest neighbor upsampling is used then typically a single subsampled Cb' component value and a single subsampled Cr' component value are used to derive the upsampled Cb' and Cr' component values for a pixel.

The pre-processing of pixels according to the embodiments can be used in different applications, in particular different video applications, including video encoding.

An embodiment therefore relates to a method of encoding a pixel in a picture. The method comprises pre-processing the pixel according to any of the embodiments as disclosed herein to derive a non-linear luma component value in the second color space for the pixel. The method also comprises, in step S3 as shown in FIG. 7, encoding the non-linear luma component value, a subsampled first non-linear chroma component value in the second color space and a subsampled second non-linear chroma component value in the second color space.

Thus, the pre-processing of pixels can be used as an additional processing during encoding pixels of pictures, such as in connection with encoding pictures of a video sequence.

The output of the pre-processing, i.e. Y'Cb'Cr', such as in the 4:2:0 or 4:2:2 format, is then input to a video encoder, such as a H.264 video encoder, a High Efficiency Video Encoder (HEVC) or H.265 video encoder, or another video encoder. The encoding as performed by the video encoder can include traditional video encoding steps, such as inter prediction, intra prediction, mode decision, transformation of residual, quantization and encoding of the transformed and quantized residuals, such as in an entropy encoder, e.g. a context-adaptive binary arithmetic coding (CABAC) encoder.

An advantage of the pre-processing of the embodiments is that it can be applied to any video or picture encoding process without the need for performing any adjustments in the video or picture encoder or any adjustments in the corresponding video or picture decoder. In clear contrast, the pre-processing can be seen as an additional processing, i.e. pre-processing, that is applied to the input pictures instead of the traditional conversion of original colors, such as $R_OG_OB_O$ colors, of pixels in pictures to be encoded into Y'Cb'Cr' colors that involves application of transfer function, application of color transform and chroma subsampling.

The pre-processing of pixels in pictures, such as of a video sequence, may also be used in other applications besides video encoding. For instance, the embodiments can be used as a pre-processing that is applied before transferring video over an interface, such as high-definition multimedia interface (HDMI), DisplayPort or Thunderbolt. For example, in HDMI 2.0a the only way to convey 4K resolution at 50 or 60 frames per second (fps) is to use 4:2:0 or 4:2:2 YCbCr subsampling. If the video data is in full chroma sampling format (4:4:4) then a subsampling pre-processing step must be applied before sending the video data over the HDMI cable. The 4:2:0 or 4:2:2 video data is then transferred over the interface without further compression. By applying the pre-processing of the embodiments, the video quality is improved compared to conventional 4:2:0 or 4:2:2 subsampling without any correction of Y' component or finding of optimal Y' component.

A typical compression chain is described below. The incoming linear light pixel (R, G, B) ranging, for instance, from 0 to 10,000 is first fed to the transfer function, which results in a new pixel (R', G', B') between 0 and 1. After this, the pixel undergoes color transform resulting in (Y', Cb', Cr). Then the Cb' and Cr' components are subsampled to 4:2:0.

After decompression, the 4:2:0 sequences are upsampled to 4:4:4 again, inverse color space conversion gives (R', G', B') and finally inverse transfer function gives back the linear light pixel (R, G, B) that can be output on a monitor.

The trouble comes from the fact that the Cb' and Cr' components are interpolated, whereas the Y' component is not. Hence, there can be a sharp shift in the Y' component in a pixel, but the Cb' and Cr' component cannot follow, since they are interpolated. For some colors, especially saturated colors, the result is a pixel of completely wrong intensity, and it is clearly visible.

It is proposed to change the Y' component in these cases so that the tuple (Y', Cb', Cr') generated from the interpolated colors is not so different from the original. Ideally the difference would be so small that it is not noticeable.

Basically it emanates to realizing that the Cb' and Cr' components are false, and then make also the Y' component false so that the (Y', Cb', Cr') are closer to the true colors. In other words, by introducing an error in the Y' component we can compensate for the errors already existing in the Cb' and Cr' components to come closer to the real pixel. It could be determined that the Cb' and Cr' components are false by comparing (Cb'-Cb'444) and (Cr'-Cr'444) with a threshold by e.g. comparing the Cb' that you get from first subsampling chroma (4:2:0) then upsampling (to 4:4:4) with the original Cb'444 and Cr'444 values before subsampling.

The corrected Y' component can be derived according to different embodiments as described below. Hence the corrected Y' component and the Cb' and Cr' components are then compressed resulting in that the image or video is perceived with a higher quality.

By changing the Y' component, i.e. deriving a corrected Y' component, we can compensate the resulting luminance value. The eye is much more sensitive to luminance changes than to chrominance changes, so the first rule should be to make sure that the luminance does not deviates too much from the original value.

As described above, the non-linear luminance Y' is adjusted prior to compression so that the linear luminance Y of the pixel is closer to its correct value. This is further described below.

Assume a picture where the left part of the screen, e.g. pixels 0 to 96, has the value (2142, 0, 138) and that the right part, e.g. pixels 97 to 1920, has the value (2142, 4, 138). With a conventional processing chain we would get the results in Table 1.

TABLE 1

Data for the "worst" color for 4:2:0 subsampling

| Pixel no. 97 | RGB value | Y value | Y diff | relative error | Barten steps |
|---|---|---|---|---|---|
| original | 2142<br>4<br>138 | 573.5991 | 0 | 0 | 0 |

TABLE 1-continued

Data for the "worst" color for 4:2:0 subsampling

| Pixel no. 97 | RGB value | Y value | Y diff | relative error | Barten steps |
|---|---|---|---|---|---|
| RGB 4:4:4 | 2142.6617<br>3.9750<br>138.2966 | 573.7735 | 0.1745 | 0.0304% | 0.0691 |
| RGB 4:2:0* | 3993.733<br>2.4265<br>263.6030 | 1066.4311 | 492.8320 | 85.9192% | 195.2710 |

*This indicates values obtained by upsampling the subsampled color in 4:2:0 format Here, the Y value is the linear luminance. That is, the Y value of the original is the value you get when you take the original linear light RGB (2142, 4, 138) and convert it to XYZ. For example, if RGB is in the BT.2020 color space you can convert to XYZ using $$X=0.636958 \times R+0.144617 \times +0.168881 \times B$$

$$Y=0.262700 \times R+0.677998 \times G+0.059302 \times B$$

$$Z=0.000000 \times R+0.028073 \times G+1.060985 \times B$$

This Y component is the luminance that the eye is sensitive to. It should not be confused with the Y' component mentioned above, which depend nonlinearly from RGB.

As can be seen in Table 1, the Y value is grossly wrong for pixel 97 when using RGB 4:2:0 subsampling and upsampling. Note that in this example, no compression has taken place, only quantization to 10 bits, and yet the Y value has a relative error of 85%. Using Barten's model that predicts how large differences the eye can see, we see that this error is 195 Barten steps, or 195 times greater than what would be just noticeable.

If we look at Table 2, we can see what happens.

TABLE 2

Pixel 97 is very different before and after color subsampling

| 4:4:4 10 bits | 94 | 95 | 96 | 97 | 98 | 99 |
|---|---|---|---|---|---|---|
| Linear RGB in | 2142<br>0<br>138 | 2142<br>0<br>138 | 2142<br>0<br>138 | 2142<br>4<br>138 | 2142<br>4<br>138 | 2142<br>4<br>138 |
| Y'Cb'Cr' 4:2:0 10 bits | 284<br>650<br>867 |  | 284<br>641<br>855 | 422<br>575<br>771 |  |  |
| Y'Cb'Cr' after upsampling | 284<br>650<br>867 | 284<br>650<br>866 | 284<br>641<br>855 | 422<br>607<br>812 | 422<br>575<br>771 | 422<br>571<br>766 |
| Linear RGB out | 2151.71<br>0<br>138.2278 | 2119.42<br>0<br>138.2278 | 1794.94<br>0.0018<br>114.8210 | 3993.73<br>2.4265<br>263.6030 | 2142.66<br>3.9750<br>138.2966 | 1986.71<br>4.2102<br>127.3837 |

If we look at the Cb' component, it has the value 607, which is about halfway between 650, before the discontinuity, i.e. pixel 94, and 575, after the discontinuity, but the correct value is 575. The trouble is that the error not only affects the chrominance but also the luminance of the pixel, which becomes way too big. Our idea is to compensate this by changing the Y' component of the pixel. According to the embodiments we do not let the Y' component be 422 for the pixel, but selects the value 363 instead. In Table 3 we show the result.

TABLE 3

| Pixel 97 is much more similar before and after color subsampling | | | | | | |
|---|---|---|---|---|---|---|
| 4:4:4 10 bits | 94 | 95 | 96 | 97 | 98 | 99 |
| Linear RGB in | 2142<br>0<br>138 | 2142<br>0<br>138 | 2142<br>0<br>138 | 2142<br>4<br>138 | 2142<br>4<br>138 | 2142<br>4<br>138 |
| Y'Cb'Cr' 4:2:0 10 bits | 284<br>650<br>867 | 284 | 284<br>641<br>855 | 363 | 422<br>575<br>771 | 422 |
| Y'Cb'Cr' after upsampling | 284<br>650<br>867 | 284<br>650<br>866 | 284<br>641<br>855 | 363<br>607<br>812 | 422<br>575<br>771 | 422<br>571<br>766 |
| Linear RGB out | 2151.71<br>0<br>138.2278 | 2119.42<br>0<br>138.2278 | 1794.94<br>0.0018<br>114.8210 | 2145.11<br>0.7008<br>138.0825 | 2142.66<br>3.9750<br>138.2966 | 1986.71<br>4.2102<br>127.3837 |

We can now see that the new color is much more similar to its correct value. The green component has gone in the wrong direction, but only by 1.72 cd/m², but at the same time the red component has almost halved to its correct value, a movement of 1849 cd/m², and the blue component has changed in a similar fashion. In Table 4 we show what happens to the luminance.

TABLE 4

Data for the "worst" color for 4:2:0 subsampling after correction

| Pixel no. 97 | RGB value | Y value | Y diff | relative error | Barten steps |
|---|---|---|---|---|---|
| original | 212<br>4<br>138 | 573.5991 | 0 | 0 | 0 |
| RGB 4:4:4 | 2142.6617<br>3.9750<br>138.2966 | 573.7735 | 0.1745 | 0.0304% | 0.0691 |
| RGB 4:2:0* | 2145.11<br>0.7008<br>138.0825 | 572.1852 | 1.4139 | 0.2465% | 0.5602 |

*This indicates values obtained by upsampling the subsampled color in 4:2:0 format As is seen in Table 4, we get a much smaller error in the luminance Y. The relative error is 0.2465%, which is equivalent to 0.5602 Barten steps, i.e. not possible to see.

The error is now instead in the chrominance, but given the fact that the human visual system is less sensitive to errors in chrominance than in luminance, this is not much of a problem. In addition, there is going to be an error in chrominance anyway since it is subsampled. Also, one may change the Y' component to get a good trade-off between the error in luminance and the error in chrominance.

Furthermore, the change in chrominance may not even be noticeable—the only difference is that the green component is 0.7008 cd/m² instead of 3.9750 cd/m² but that is most likely dwarfed by the red component anyway, since it is 2145, almost a thousand times larger. Another way to see it is that the ratio between the green and the red components becomes 0.7008/2145.11=0.000327 instead of the correct 3.9750/2142.6617=0.001855. It is not clear that this slight shift in hue is possible to see for the human eye. Hence we have traded an error in luminance that is 200 times larger than what is just noticeable to an error in chrominance that is so small it might not be possible to see.

The nice thing is that the changed Y' value only affects the individual pixel. Hence no other pixel is sacrificed by changing the Y' component.

In an embodiment, the value Y' is not optimized for a specific value of Cb' and Cr'. Instead the Y' value is selected so that it minimizes the luminance error for some different values of Cb' and Cr' or for a range of Cb' and Cr' values. This can be done in scenarios where the chroma upsampling method is unknown.

One variant is to perform a specific number of chroma upsampling methods and then select the Y' value that minimizes the average squared error for the different upsampling methods. In another version, the Y' value is selected so that the worst case, i.e. largest error, is minimized.

Another variant is to use two or more neighboring values of Cb' and Cr' and use them directly to calculate the range of possible Cb' and Cr' values.

There are several ways to find the best value for Y', we will go through a number of them. One way is shown in FIG. 8.

First we need to find the value $Y_O$ to optimize towards. The original pixel $R_O$, $G_O$, $B_O$ is transformed from RGB to XYZ as mentioned above. This results in $X_O$, $Y_O$, $Z_O$, of which we are only interested in $Y_O$. In fact, we do not need to calculate $X_O$ and $Z_O$. This $Y_O$ is the original luminance in linear light, and it is this that the eye is sensitive to. In our test case $Y_O$ is equal to 573.5991, see Table 1.

Second, we take our existing Y' value, together with the Cb' and Cr' values. In the case above, we would feed in (422, 607, 812), see Table 2. Now we would do a color transform from Y'Cb'Cr' to R'G'B'. This is done using $$R = Y' + 1.47460 \times Cr'$$

$$G = Y' - 0.16455 \times Cb' - 0.57135 \times Cr'$$

$$B = Y' + 1.88140 \times Cb'.$$

Next we invoke the transfer function. In this case we use the PQ-EOTF, which can be implemented using the following Matlab code, for instance:

```
function L=pq_eotf(c)
%%%
%%% c goes from 0.0 to 1.0%
%%% L is output luminance in nits
%%%
c1=0.8359375;
c2=18.8515625;
c3=18.6875;
n=0.1593017578125;
m=78.84375;
c=max(c,0);
c=min(c,1);
L=10000*((max(c.^(1/m)-c1, 0)./(c2-c3*c.^(1/m))).^(1/n));
```

The result is the color (R, G, B) in linear light. Now we convert this to XYZ as mentioned above, or really, we only need to calculate Y. This Y is the linear luminance of the pixel, and it is this luminance that we want to make as close as possible to $Y_O$. In our test case, Y starts out being 1066.4311, see Table 1.

Now we compare Y and $Y_O$. If Y is bigger than $Y_O$, we reduce our Y' value from 422 to something smaller. For instance, we can take one step and try 421. Then the entire calculation is carried out again, generating a new Y value. This is again compared to $Y_O$, and if it is still too big, we reduce Y' further. Finally, we will reach 363 and the resulting Y value, i.e. 572.1852 is now smaller than $Y_O$, i.e. 573.5991. The process now stops.

In the embodiment above it takes 422−363=59 iterations to reach the best value. This may be costly.

Therefore, an embodiment is to do a binary search to find the best Y' value. Optionally, first the maximum Y' value is tried, for instance 1023. Optionally, then the minimum Y' value is tried, for instance 0. Then a value in the middle is tried, for instance 512. If the Y value resulting from Y'=512 is larger than $Y_O$, we should search in the interval [0, 512]. If the Y-value is smaller than $Y_O$, we should instead search the interval [512, 1023]. We then proceed by calculating a new value in the middle of the selected interval, and proceeds until the interval only contains a single number, such as [363, 363], or [363, 364]. This is guaranteed to only take $\log_2(N)$ steps, where N is the number of possible values, which in this case is 1024. Hence only $\log_2(1024)=10$ steps are sufficient.

Yet another way to calculate the best value is to see FIG. 8 as an optimization problem and minimize the error $E=(Y-Y_O)^2$ with respect to Y'. This can be done by gradient descent, by calculating the gradient of E with respect to Y', i.e. dE/dY', and update Y' a small amount in the opposite direction of the gradient: $Y'_{n+1}=Y'_n-\alpha \times dE/dY'$, where $\alpha$ is a small constant.

Gradient descent can be slow, so a quicker way may be to use a second-order optimization algorithm that calculates or approximates the second order derivatives $d^2E/dY'^2$. Gauss-Newton is an example of such an algorithm.

In another embodiment the following process is applied in order to calculate Y':
X, $Y_O$ and Z are converted with a XYZ to RGB conversion to produce new values R1, G1 and B1
R1, G1 and B1 are converted with an inverse transfer function to produce R1', G1' and B1'.
R1', G1' and B1' are converted with an inverse color transform to produce Y'

In an embodiment, the Y' values of all pixels in an image or picture are corrected. In an alternate embodiment, only pixels that are at risk of having visible luminance errors are corrected. This may include pixels that are close to the color gamut edge, but exclude pixels closer to the middle of the color gamut triangle.

Figure 9:
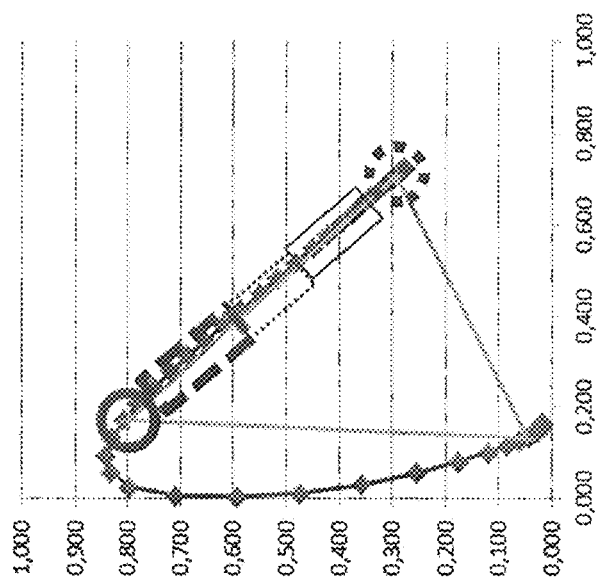
FIG. 9 illustrates that different linearizations can be used in different areas.

Looking at the bottom row in FIG. 9, the first step of processing is $$R'=Y'+1.47460 \times Cr'$$

$$G'=Y'-0.16455 \times Cb'-0.57135 \times Cr'$$

$$B'=Y'+1.88140 \times Cb'.$$

But since Cr' and Cb' are fixed, they are interpolated, not sent, we can replace everything to the right of Y' with a constant $$R'=Y'+c1$$

$$G'=Y'+c2$$

$$B'=Y'+c3$$

The next step is taking the transfer function of the color components:

$$R=TF(R')$$

$$G=TF(G')$$

$$B=TF(B')$$

which then becomes $$R=TF(Y'+c1)$$

$$G=TF(Y'+c2)$$

$$B=TF(Y'+c3)$$

The last step of the processing is going from RGB to XYZ. This is done using $$X=0.636958 \times R+0.144617 \times G+0.168881 \times B$$

$$Y=0.262700 \times R+0.677998 \times G+0.059302 \times B$$

$$Z=0.000000 \times R+0.028073 \times G+1.060985 \times B$$

of this we are only interested in the Y component, so we use $$Y=0.262700 \times R+0.677998 \times G+0.059302 \times B.$$

Inserting the previous equations into this gives $$Y=0.262700 \times TF(Y'+c1)+0.677998 \times TF(Y'+c2)+0.059302 \times TF(Y'+c3),$$

or shortened to $$Y=f(Y')$$

We want the output value Y of this equation to match the original $Y_O$. Since the Y depends on Y' in three different places in a nonlinear way, there seems to be no easy way to invert the function so that we can get $Y'=f^{-1}(Y)$.

However, it is possible to linearize the nonlinear TF(x)~kx+m. Doing this in the three different places gives $$Y \sim k1 \times Y'+m1+k2 \times Y'+m2+k3 \times Y'+m3$$

which is equivalent to $$Y \sim (k1+k2+k3) \times Y'+(m1+m2+m3).$$

This can be inverted to $$Y' \sim Y'k=(Y_O-(m1+m2+m3))/(k1+k2+k3).$$

Thus it is likely that Y'k will produce a value Yk closer to $Y_O$ than before. The function can be linearized again at this new point Y'k, resulting in a new value Y'k+1, etc.

It should be noted that for all these iterative techniques it is not necessary to find the absolutely best 10 bit value that generates the Y value closest to the $Y_O$ value. It may be sufficient to just use a few iterations or even one iteration. The corrected Y value resulting from a single iteration will most likely be much better than not correcting at all.

Some linearizations may also be done in advance. As noticed above, the worst problems occur on the gamut edge. Hence one could have one linearization for the line connecting the red primary to the green primary, one linearization for the line connecting the red primary to the blue primary and one linearization for the line connecting the green primary to the blue primary. Another way may be to have linearizations that will be used close to the red primary, another close to the green primary, and a third that is used close to the blue primary. Furthermore it is possible to have several linearizations along the line of the gamut, as shown in FIG. 9.

Thus, there can be different linearizations in different areas. If the color is inside the circle with a solid line, we are close to the green primary and we can use one linearization. If we are further along towards the red primary, i.e. inside the dashed box, we can use a second linearization. If we are close to the edge of the gamut and roughly half ways between the red and the green primary, i.e. inside the dotted box, a third linearization can be used. If we are even closer to the red primary, i.e. inside the box with a solid line, a fourth linearization can be used. If we are inside the dotted circle, i.e. close to the red primary, a fifth linearization can be used. The same partitioning of the other two lines in the triangle can also be used. Finally the area inside the triangle but in no box or circle can be partitioned into one or more areas, each area having a different linearization.

Another way is to create a look-up table (LUT). As can be seen from the above formulation, if we have Cb', Cr' and the wanted Y-value, it is possible to find the best Y' using any of the iterative techniques mentioned above. Hence we can create a look-up table for every possible combination of Cb', Cr' and Y. Assume for instance that Cb' and Cr' is quantized to 10 bits. Assume further that we also quantize Y to 10 bits. We then need $2^{10} \times 2^{10} \times 2^{10}$ different values in our look-up table. That is equivalent to $2^{30}$ values. If each value is two bytes, this means $2^{31}$ bytes, or 2 Gb. That is big but maybe not infeasible, especially in the future.

Care may need to be taken when quantizing Y. Since Y is completely linear, it may be inefficient to just quantize it. It may instead be better to create Ynonlinear=TF(Y) and instead create a LUT for Y using Cb', Cr' and Ynonlinear as input variables. Given Cb', Cr' and Y, we would then first calculate Ynonlinear=TF(Y) and then find Y'=LUT(Cb', Cr', Ynonlinear).

It may also be possible to use a smaller LUT. For instance, it may be possible to quantize Y (or Ynonlinear), Cb' and Cr' to, say, 6 bits. Then the table size would be $2^{(6+6+6)}=2^{18}$ values or $2^{19}$ bytes, which is equal to 512 kbytes. That is a reasonable size even with today's hardware.

It may be possible to take the quantized values Cb', Cr' and Y closest to the true values and interpolate them. As an example, if the real value of Cb' is bigger than Cb' quantized to 6 bits but smaller than Cb' quantized to 6 bits+1, the following may be good approximation:

$$Y'=(LUT(Cb'6\ bit, Cr'6\ bit, Y6\ bit)+LUT(Cb'6\ bit+1, Cr'6\ bit, Y6\ bit))/2$$

Interpolating between more than two values is also possible.

In an embodiment, a look-up-table is used for deriving the value of Y'. In one version the look-up-table contains every possible value of $Y_O$, Cb' and Cr'. For 10 bit video that will result in 1024×1024×1024 entries and in some applications this size is acceptable. In another version the look-up-table (LUT) is pruned, for example through rounding one or more of $Y_O$, Cb' and Cr', e.g. to 8 bits. If a pruned look-up-table is used the algorithm can be extended with a refinement step that finds the best Y' starting from the Y' that was retrieved from the LUT. In a version the LUT is only used when the Cb' value and/or the Cr' value is such that Y' can become too different from $Y_O$, i.e. when the initially calculated Y' gives a linear Y value that is too different from $Y_O$, and thereby the size of the LUT can be substantially reduced since many values of Cb' and Cr' will not cause any problems.

In an embodiment, a function of $Y_O$, Cb' and Cr', e.g. a linear combination, polynomial function, exponential function, logarithmic function, trigonometric function, etc., is used for deriving Y'. The function can be defined such that for any value of $Y_O$, Cb' and Cr' the difference between Y and $Y_O$ is below a certain threshold or the difference between the derived Y' and the optimal Y' is below a certain threshold.

In an embodiment several different function of $Y_O$, Cb' and Cr' are defined for deriving Y'. The selection of which function to use is based on the value of $Y_O$, Cb' and Cr'.

For each embodiment described herein it could be the case that the method for deriving Y' is only invoked if the difference between Y' and TF($Y_O$) is above a certain threshold to begin with.

According to an aspect, a method is provided as illustrated in FIG. 10. The method can be performed in an encoder or in a pre-process to the encoder. In the method, when it is determined that the Cb' and/or Cr' components include errors, a corrected Y' component is derived to compensate for the errors in the Cb' and/or the Cr' components. The method optionally also comprise encoding video with the corrected Y' component.

Another aspect of the embodiments relates to a device for pre-processing a pixel in a picture. The device is configured to obtain an original linear luminance component value of the pixel in a third color space determined based on a linear color of the pixel in a first color space. The device is also configured to derive a non-linear luma component value in a second color space for the pixel based on a first non-linear chroma component value in the second color space, a second non-linear chroma component value in the second color space and the original linear luminance component value in the third color space.

In an embodiment, the device is configured to determine the original linear luminance component value in the third color space based on the linear color in the first color space.

In an embodiment, the device is configured to derive a non-linear luma component value in the second color space that minimizes a difference between the original linear luminance component value in the third color space and a linear luminance component value in the third color space determined based on the non-linear luma component value in the second color space, the first non-linear chroma component value in the second color space and the second non-linear chroma component value in the second color space.

In an embodiment, the device is configured to derive the non-linear luma component value in the second color space based on a subsampled first non-linear chroma component value in the second color space, a subsampled second non-linear chroma component value in the second color space and the original linear luminance component value in the third color space.

In an embodiment, the device is configured to apply a first transfer function to the original linear color in the first color space to get a non-linear color in the first color space. The device is also configured to apply a first color transform to the non-linear color in the first color space to get a non-linear color in the second color space. The non-linear color in the second color space comprises an initial first non-linear chroma component value and an initial second non-linear chroma component value. The device is further configured to subsample the initial first non-linear chroma component value in the second color space and the initial second non-linear chroma component value in the second color space to get the subsampled first non-linear chroma component value in the second color space and the subsampled second non-linear chroma component value in the second color space.

In an embodiment, the device is configured to upsample the subsampled first non-linear chroma component value in the second color space and the subsampled second non-linear chroma component value in the second color space to get an upsampled first non-linear chroma component value in the second color space and an upsampled second non-linear chroma component value in the second color space. The device is also configured to apply a second color transform to a candidate non-linear luma component value in the second color space, the upsampled first non-linear chroma component value in the second color space and the upsampled second non-linear chroma component value in the second color space to get a non-linear color in the first color space. The device is further configured to apply a second transfer function to the non-linear color in the first color space to get a linear color in the first color space. The device is additionally configured to apply a third color transform to the linear color in the first color space to get a linear luminance component value in the third color space. The device is also configured to derive the non-linear luma component value based on a comparison of the original linear luminance component value in the third color space and the linear luminance component value in the third color space.

In an embodiment, the device is configured to select a candidate non-linear luma component in the second color space that reduces, such as minimizes, a difference between the original linear luminance component in the third color space and the linear luminance component in the third color space.

In an embodiment, the device is configured to perform application of the second color transform to a candidate non-linear luma component value in the second color space, the upsampled first non-linear chroma component value in the second color space and the upsampled second non-linear chroma component value in the second color space, application of the second transfer function to the non-linear color in the first color space and application of the third color transform to the linear color in the first color space for different candidate non-linear luma component values in the second color space. The device is also configured to select the candidate non-linear luma component value among the different candidate non-linear luma component values in the second color space that results in a smallest difference between the original linear luminance component value in the third color space and the linear luminance component value in the third color space.

In an embodiment, the device is configured to perform a binary search to select a candidate non-linear luma component value in the second color space that minimizes a difference between the original linear luminance component value in the third color space and the linear luminance component value in the third color space.

In an embodiment, the device is configured to perform application of the second color transform to a candidate non-linear luma component value in the second color space, the upsampled first non-linear chroma component value in the second color space and the upsampled second non-linear chroma component value in the second color space, application of the second transfer function to the non-linear color in the first color space and application of the third color transform to the linear color in the first color space for a candidate non-linear luma component value in the second color space in the middle of a search interval. The device is also configured to select the candidate non-linear luma component value in the middle of the search interval if the difference between the original linear luminance component value in the third color space and the linear luminance component value in the third color space is equal to zero. The device is also configured to otherwise select a search interval having half the size as compared to the search interval used by the device when performing the applications and ending at the candidate non-linear luma component value used by the device when performing the applications if the linear luminance component value in the third color space is larger than the original linear luminance component value in the third color space or select a search interval having half the size as compared to the search interval used by the device when performing the applications and starting at the candidate non-linear luma component value used by the device when performing the applications if the linear luminance component value in the third color space is smaller than the original linear luminance component value in the third color space. the device is further configured to repeat performing the applications and selection of the search interval until the difference between the original linear luminance component value in the third color space and the linear luminance component value in the third color space is equal to zero or the search interval comprises a single candidate non-linear luma component value in the second color space.

In an embodiment, the device is configured to upsample the subsampled first non-linear chroma component value in the second color space and the subsampled second non-linear chroma component value in the second color space to get an upsampled first non-linear chroma component value in the second color space and an upsampled second non-linear chroma component value in the second color space. The device is also configured to retrieve the non-linear luma component value in the second color space from a look-up table using the original linear luminance component value in the third color space, or a non-linear version thereof, the upsampled first non-linear chroma component value in the second color space and the upsampled second non-linear chroma component value in the second color space, or quantized versions thereof, as input to the look-up table.

In an embodiment, the device is configured to apply the first transfer function to the original linear luminance component value in the third color space to get an original non-linear luminance component value in the third color space. The device is configured to retrieve the non-linear luma component value in the second color space from the look-up table using the original non-linear luminance component value in the third color space, the upsampled first non-linear chroma component value in the second color space and the upsampled second non-linear chroma component value in the second color space, or the quantized versions thereof, as input to the look-up table.

Figure 11:
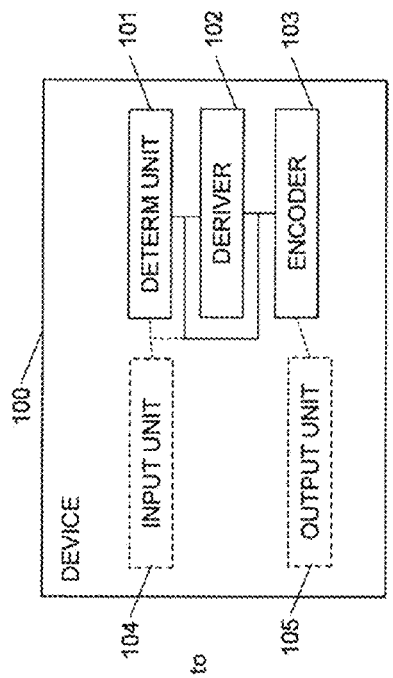
FIG. 11 is a schematic illustration of a hardware implementation of a device according to the embodiments.

FIG. 11 illustrates a particular hardware implementation of a device 100 for pre-processing a picture according to an embodiment. In an embodiment, the device 100 comprises a determining unit 101 configured to obtain the original linear luminance component value of the pixel in the third color space. The device 100 also comprises a deriver 102 configured to derive the non-linear luma component value in the second color space for the pixel.

In another embodiment, the device 100 comprises a determining unit 101 configured to determine that Cb' and/or Cr' include errors. The device 100 also comprises a deriver 102 configured to derive a corrected Y'. The device 100 further comprises a video encoder 103 configured to encode a picture with the corrected Y'.

In an embodiment, the device 100 also comprises an input unit 104 configured to receive the video to be encoded and an output unit 105 configured to output an encoded bitstream.

The input unit 104 could be in the form of a general input unit, in particular in the case of a wired connection to external devices. Alternatively, the input unit 104 could be in the form of a receiver or transceiver, in particular in the case or a wireless connection to external devices. Correspondingly, the output unit 105 could be in the form of a general output unit, in particular in the case of a wired connection to external devices. Alternatively, the output unit 105 could be in the form of a transmitter or transceiver, in particular in the case or a wireless connection to external devices The input unit 104 is preferably connected to the determining unit 101, the deriver 102 and the video encoder 103 to forward the video to be encoded thereto. The determining unit 101 is preferably connected to the deriver 102 and the video encoder 103. The video encoder 103 is preferably connected to the output unit 105 to forward the encoded bitstream to, for instance, a decoder.

Particular examples of suitable hardware circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more FPGAs, or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 12:
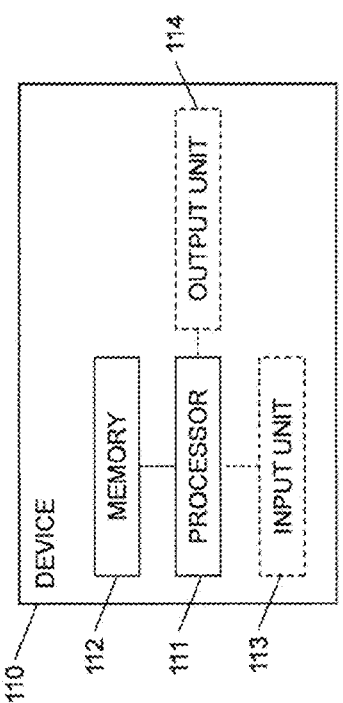
FIG. 12 is a schematic illustration of an implementation of a device according to the embodiments with a processor and a memory.

In a particular example, the device 110, see FIG. 12, comprises a processor 111 and a memory 112 comprising instructions executable by the processor 111. In an embodiment, the processor 111 is operative to obtain the original linear luminance component value of the pixel in the third color space. The processor 111 is also operative to derive the non-linear luma component value in the second color space for the pixel.

In another embodiment, the processor 111 is operative to determine that the Cb' and/or Cr' components include errors and when it is determined that the Cb' and/or Cr' components include errors. The processor 111 is also operative to derive a corrected Y' component to compensate for the errors in the Cb' and/or the Cr' components.

In an embodiment, the device 110 also comprises an input unit 113 configured to receive the video to be encoded. In such a case, the processor 111 is operative to receive the video to be encoded from the input unit 113.

In an embodiment, the device 110 also comprises an output unit 114 configured to output an encoded bitstream as received from the processor 111.

In a particular embodiment, the processor 111 is operative, when executing the instructions stored in the memory 112 to perform the above described operations. The processor 111 is thereby interconnected to the memory 112 to enable normal software execution.

Figure 13:
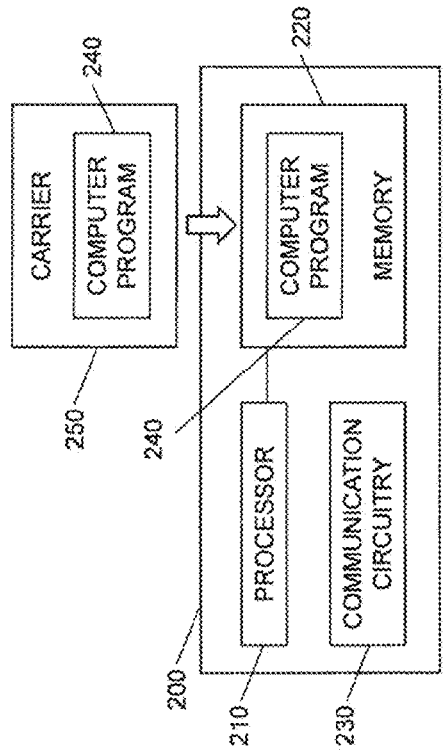
FIG. 13 is a schematic illustration of a user equipment according to an embodiment.

FIG. 13 is a schematic block diagram illustrating an example of a user equipment (UE) 200 comprising a processor 210, an associated memory 220 and a communication circuitry 230.

In this particular example, at least some of the steps, functions, procedures, modules and/or blocks described herein are implemented in a computer program 240, which is loaded into the memory 220 for execution by processing circuitry including one or more processors 210. The processor 210 and memory 220 are interconnected to each other to enable normal software execution. A communication circuitry 230 is also interconnected to the processor 210 and/or the memory 220 to enable input and/or output of video data.

The user equipment 200 can be any device or apparatus that can receive and process video data. For instance, the user equipment 200 could be a computer, either stationary or portable, such as laptop, a smart phone, a tablet, a set-top box, a video camera, etc.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In an embodiment, the computer program 240 comprises instructions, which when executed by the processor 210, cause the processor 210 to obtain an original linear luminance component value of a pixel in a picture in a third color space determined based on a linear color of the pixel in a first color space. The processor 210 is also caused to derive a non-linear luma component value in a second color space for the pixel based on a first non-linear chroma component value in the second color space, a second non-linear chroma component value in the second color space and the original linear luminance component value in the third color space.

In an embodiment, the computer program 240 further comprises instructions, which when executed by the processor 210, cause the processor 210 to encode the non-linear luma component value, the first non-linear chroma component value and the second non-linear chroma component value.

In another embodiment, the computer program 240 comprises instructions, which when executed by the processor 210, cause the processor 210 to determine that the Cb' and/or Cr' components include errors, and when it has determined that the Cb' and/or Cr' components include errors, they cause the processor 210 to derive a corrected Y' component to compensate for the errors in the Cb' and the Cr' components.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium 250.

By way of example, the software or computer program 240 may be realized as a computer program product, which is normally carried or stored on a computer-readable medium 240, preferably non-volatile computer-readable storage medium 250. The computer-readable medium 250 may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device. The computer program 240 may thus be loaded into the operating memory of a computer or equivalent processing device, represented by the user equipment 200 in FIG. 19, for execution by the processor 210 thereof.

A further aspect of the embodiments also relates to a signal representing an encoded version of a pixel in a picture. The encoded version comprises an encoded version of a subsampled first non-linear chroma component value in a second color format, an encoded version of a subsampled second non-linear chroma component value in the second color format and an encoded version of a non-linear luma component value in the second color format derived according to any of the embodiments.

In an embodiment, the signal is one of an electronic signal, an optical signal, an electromagnetic signal, a magnetic signal, an electric signal, a radio signal and a microwave signal.

The flow diagram or diagrams presented herein may therefore be regarded as a computer flow diagram or diagrams, when performed by one or more processors. A corresponding device may be defined as a group of function modules, where each step performed by the processor corresponds to a function module. In this case, the function modules are implemented as a computer program running on the processor. Hence, the device may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in FIG. 14.

Figure 14:
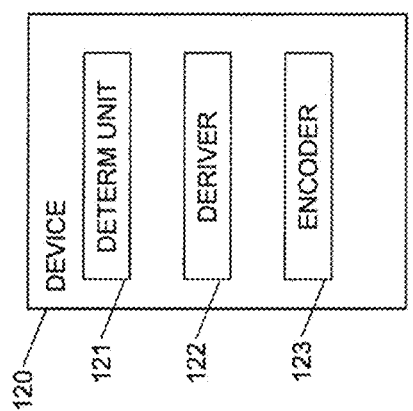
FIG. 14 is a schematic illustration of an implementation of a device according to the embodiments with function modules.

FIG. 14 is a schematic block diagram of a device 120 for pre-processing a pixel in a picture with function modules. In an embodiment, the device 120 comprises a determining unit 121 for obtaining an original linear luminance component value of the pixel in a third color space determined based on a linear color of the pixel in a first color space. The device 120 also comprises a deriver 122 for deriving a non-linear luma component value in a second color space for the pixel based on a first non-linear chroma component value in the second color space, a second non-linear chroma component value in the second color space and the original linear luminance component value in the third color space.

In another embodiment, the device 120 comprises a determining unit 121 for determining that Cb' and/or Cr' include errors. The device 120 also comprises a deriver 102 for deriving a corrected Y'. The device 120 further, optionally, comprises a video encoder 123 for encoding the bitstream using the corrected Y'.

A further aspect of the embodiments, see FIG. 12, relates to a device 110 for encoding a pixel in a picture. The device 110 comprises a processor 111 and a memory 112 comprising instructions executable by the processor 111. The processor 111 is operative to obtain an original linear luminance component value of the pixel in a third color space determined based on a linear color of the pixel in a first color space. The processor 111 is also operative to derive a non-linear luma component value in a second color space for the pixel based on a first non-linear chroma component value in the second color space, a second non-linear chroma component value in the second color space and the original linear luminance component value in the third color space. The processor 111 is further operative to encode the non-linear luma component value, the first non-linear chroma component value and the second non-linear chroma component value.

Another further aspect of the embodiments, see FIG. 14, relates to a device 120 for encoding a pixel in a picture. The device 120 comprises a determining unit 121 for obtaining an original linear luminance component value of the pixel in a third color space determined based on a linear color of the pixel in a first color space. The device 120 also comprises a deriver 122 for deriving a non-linear luma component value in a second color space for the pixel based on a first non-linear chroma component value in the second color space, a second non-linear chroma component value in the second color space and the original linear luminance component value in the third color space. The device 120 further comprises an encoder 123 for encoding the non-linear luma component value, the first non-linear chroma component value and the second non-linear chroma component value.

According to an aspect a unit, such as a pre-processor or an encoder, is provided. The unit is configured to determine that the Cb' and/or Cr' components include errors, and when it has determined that the Cb' and/or Cr' components include errors, it is configured to derive a corrected Y' component to compensate for the errors in the Cb' and the Cr' components.

The present embodiments also relates to a user equipment comprising a device for pre-processing a pixel or a device for encoding a pixel according to the embodiments. The user equipment is preferably a device or apparatus configured to receive and process video data. The user equipment could, for instance, be a device or apparatus configured to forward video data over an interface, such as HDMI.

Another embodiment relates to a user equipment comprising a device for pre-processing a pixel or a device for encoding a pixel according to the embodiments. In this embodiment, the user equipment is preferably selected from a group consisting of a computer, a laptop, a smart phone, a tablet and a set-top box.

It is becoming increasingly popular to provide computing services, such as hardware and/or software, in network devices, such as network nodes and/or servers, where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

Figure 15:
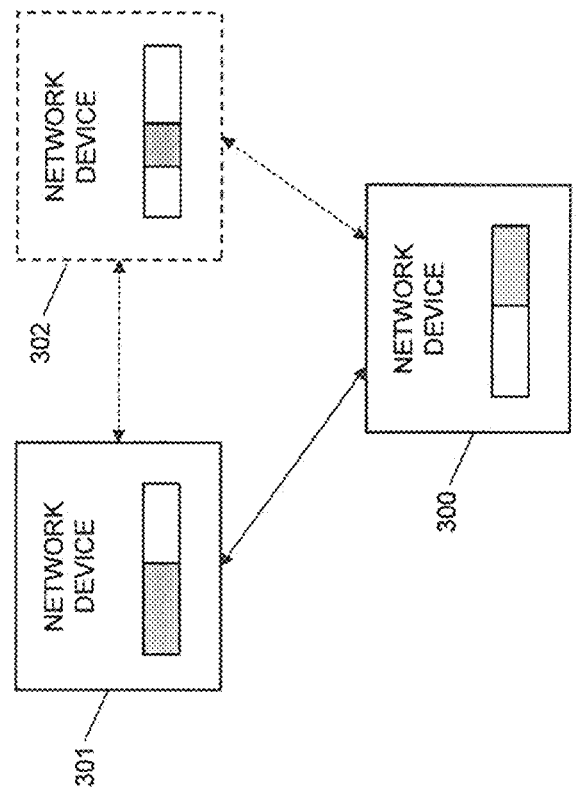
FIG. 15 schematically illustrate a distributed implementation of the embodiments among multiple network devices.

FIG. 15 is a schematic diagram illustrating an example of how functionality can be distributed or partitioned between different network devices 300, 301, 302 in a general case. In this example, there are at least two individual, but interconnected network devices 300, 301, which may have different functionalities, or parts of the same functionality, partitioned between the network devices 300, 301. There may be additional network devices 302 being part of such a distributed implementation. The network devices 300, 301, 302 may be part of the same wireless communication system, or one or more of the network devices may be so-called cloud-based network devices located outside of the wireless communication system.

FIG. 16 is a schematic diagram illustrating an example of a wireless communication system, including an access network 1 and/or a core network 2 and/or an Operations and Support System (OSS) 3 in cooperation with one or more cloud-based network devices 300. The figure also illustrates a network node 4 of the access network 1 and a user equipment 5 according to the embodiments.

EXAMPLE

Recently, a tremendous increase in quality has been achieved in digital video by increasing resolution, going from standard definition via high definition to 4 k. High dynamic range (HDR) video uses another way to increase perceived image quality, namely by increasing contrast. The conventional TV system was built for luminances between 0.1 candela per square meter (cd/m$^2$) and 100 cd/m$^2$, or about ten doublings of luminance, this is generally referred to as standard dynamic range (SDR) video. As a comparison, some HDR monitors are capable of displaying a range from 0.01 to 4000 cd/m$^2$, i.e. over 18 doublings.

Conventional SDR Processing

Typical SDR systems such as TVs or computer monitors often use an eight bit representation where 0 represents dark and 255 bright. Just linearly scaling the code value range [0; 255] to the luminance range [0.1; 100] cd/m$^2$ mentioned above would not be ideal: The first two code words 0 and 1 would be mapped to 0.1 cd/m$^2$ and 0.49 cd/m$^2$ respectively, a relative difference of 390%. The last two code words 254 and 255 on the other hand, would be mapped to 99.61 cd/m$^2$ and 100 cd/m$^2$ respectively, a relative difference of only 0.3%. To avoid this large difference in relative step sizes, SDR systems include an electro-optical transfer function (EOTF) which maps code values to luminances in a non-linear way. As an example, the red component is first divided by 255 to get a value $R_{01} \in [0; 1]$ and then fed through a power function $R' = (R_{01})^\gamma$.

Finally R' is scaled to the range [0.1; 100] to get the light representation in cd/m$^2$. The green and blue components are handled in the same way. By selecting $\gamma = 2.4$, the relative difference between the first two code words becomes 0:16% and ditto for the last two code words 0.95%, which is much more balanced.

SDR Acquisition Process

Assuming the camera sensor measures linear light (R, G, B) in cd/m$^2$, the first step is to divide by the peak brightness to get to normalized linear light ($R_{01}$, $G_{01}$, $B_{01}$). Then the inverse of the EOTF is applied $R' = (R_{01})^{1/\gamma}$, and likewise for green and blue. To decorrelate the color components, a color transform from the RGB color space to the YCbCr is applied. The next step is to quantize the data. In this example we quantize to 10 bits, yielding components ($Y'_{444}$, $Cb'_{444}$, $Cr'_{444}$) that vary from 0 to 1023. Finally, the two chroma components are subsampled to get ($Y'_{420}$, $Cb'_{420}$, $Cr'_{420}$). The data can now be sent to a video encoder, such as HEVC encoder.

Display of SDR Data

On the receiver side, the HEVC bitstream is decoded to recover ($Y'_{420}$, $Cb'_{420}$, $Cr'_{420}$) or rather decoded versions of these values due to the fact that HEVC is a lossy decoder. The signal is then processed in reverse to what is described above. The end result is the linear light representation (R, G, B), which is displayed.

HDR Processing

For HDR data, which may include luminances of up to 10 000 cd/m$^2$, a simple power function is not a good fit to the contrast sensitivity of the human eye over the entire range of luminances. Any fixed value of $\gamma$ will result in too coarse a quantization either in the dark tones, the bright tones, or the mid tones. To solve this problem, the EOTF defined as $$R_{01} = \left( \frac{(R')^{1/m} - c_1}{c_2 - c_3 (R')^{1/m}} \right)^{1/n}$$

is used. The peak luminance is also changed from 100 to 10 000.

Problem

If applying the conventional SDR processing outlined above but with the new EOTF defined above and peak luminance equal to 10,000, something unexpected occurs. As is shown by comparing FIGS. 17A and 17B and FIGS. 18A and 18B, artifacts appear. Note that for FIGS. 17A, 17B, 18A, 18B, no compression has taken place other than subsampling and quantizing to 10 bits. Yet disturbing artifacts occur.

Analysis

Assume that the following two pixels are next to each other in a picture:
RGB1=(1000; 0; 100); and
RGB2=(1000; 4; 100)

Note that these colors are quite similar. However, the first processing steps yield
$Y'_{444} Cb'_{444} Cr'_{444} 1 = (263; 646; 831)$ and
$Y'_{444} Cb'_{444} Cr'_{444} 2 = (401; 571; 735)$
which are quite different from each other. The average of these two values is Y'Cb'Cr'=(332; 608.5; 783). Now if we would go backwards in the processing chain to see what linear RGB value this represents, we get RGB=(1001; 0.48; 100.5), which is quite close to both RGB1 and RGB2. Thus, just averaging all three components is not a problem. A larger problem arises when only Cb' and Cr' are interpolated, and we use the Y' values from the pixels without interpolation. This is what is done in conventional chroma subsampling, which is performed in order to create a 4:2:0 representation. For instance, taking Y' from the first pixel above, i.e. Y'Cb'Cr'=(263; 608.5; 783) represents a linear RGB color of (484; 0.03; 45), which is much too dark. Similarly, taking Y' from the second pixel, i.e. Y'Cb'Cr'=(401; 608.5; 783) gives an RGB value of (2061; 2.2; 216), which is too bright.

Possible Workarounds

Consider adding a third pixel to the example,
RGB3=(1000; 8; 100)

If we convert these linear inputs to R'G'B' we get
R'G'B'1=(0.7518; 0.0000; 0.5081)
R'G'B'2=(0.7518; 0.2324; 0.5081)
R'G'B'3=(0.7518; 0.2824; 0.5081).

Clearly, the jump in G' is bigger between the first and second pixel although the linear G changes in equal steps of 4. Likewise, the difference between the Y'Cb'Cr' coordinates will be bigger between the first two pixels than the last two. Hence, the effect will be biggest when one or two of the components are close to zero in linear light, i.e. when the color is close to the edge of the color gamut. Thus, one way to avoid the artifacts can be to just avoid saturated colors. However, the larger color space of BT.2020 was introduced specifically to allow for more saturated colors, so that solution is not desirable.

This highlights another issue. Much test content is shot in Rec.709, and after conversion to BT.2020, none of the colors will be fully saturated and thus the artifacts will be small. As an example, a pixel acquired in Rec.709, e.g. RGB709=(0; 500; 0) will after conversion to BT.2020 no longer have any zero components, RGB2020=(165; 460; 44). Later on, when cameras are capable of recording in BT.2020, much stronger artifacts will appear. To emulate the effect of BT.2020 content in a BT.2020 container, we have therefore used Rec.709 material in a Rec.709 container for the processing of the figures in this example. Mathematically, however, there is no difference, since the coordinates $R_{01}G_{01}B_{01}$ will span the full range of [0; 1] in both cases.

Another workaround is to use constant luminance processing (CL). In CL, all of the luminance is carried in Y', as opposed to only most of the luminance being carried in the luma Y' in the above presented processing, which is referred to as non-constant luminance processing (NCL). However, one problem with CL is that it affects the entire chain; converting back and forth between a 4:2:0/4:2:2 CL representation and a 4:2:0/4:2:2 NCL representation endangers introducing artifacts in every conversion step. In practice it has therefore been difficult to convert entire industries from conventional NCL to CL.

Proposed Solution: Luma Adjustment

A basic idea is to make sure that the resulting luminance matches the desired one. With luminance, we mean the Y component of the (linear) CIE1931 XYZ color space. This Y is different from the luma Y' mentioned above since Y is calculated from the linear R G B values $Y=w_R R+w_G G+w_B B$ (1), where $w_R=0.2627$, $w_G=0.6780$ and $w_B=0.0593$. The luminance Y corresponds well to how the human visual system appreciates brightness, so it is interesting to preserve it well. This is shown in FIG. 19 where both the processed signal (top) and the original signal (bottom) is converted to linear XYZ. Then the Y components are quite different as can be seen in the figure. The key insight is that the luma value Y' can be changed independently in each pixel, and therefore it is possible to arrive at the correct desired or original linear luminance $Y_O$ by changing Y' until $\hat{Y}$ equals $Y_O$, as is shown in FIG. 20. It is also the case that $\hat{Y}$ increases monotonically with Y', which means that it is possible to know the direction in which Y' should be changed. Therefore simple methods such as interval halving can be used to find the optimal Y', in at most ten steps for 10 bit quantization. If a one-step solution is preferred, it is possible to use a 3D look-up table that takes in Cb, Cr and desired linear luminance $Y_O$ and delivers Y'.

Implementation Aspects

The technique can be implemented efficiently in the following way: First, the desired, or original luminance $Y_O$ for each pixel is obtained by applying Equation 1 to the original (R, G, B) values of each pixel. Second, the entire chain: (R, G, B)→(normalization)→($R_{01}$, $G_{01}$, $B_{01}$)→ ($EOTF^{-1}$)→(R', G', B')→(color transform)→($Y'_{01}$, $Cr'_{0.5}$, $Cr'_{0.5}$)→(10-bit quantization)→($Y'_{444}$, $Cb'_{444}$, $Cr'_{444}$)→ (chroma subsampling)→($Y'_{420}$, $Cb'_{420}$, $Cr'_{420}$)→(chroma upsampling)→($\hat{Y}'_{444}$, $\hat{Cb}'_{444}$, $\hat{Cr}'_{444}$)→(inverse quantization)→($\hat{Y}'_{0.1}$, $\hat{Cb}'_{0.5}$, $\hat{Cr}'_{0.5}$) is carried out. Then, for each pixel, a starting interval of [0; 1023] is set. Next, the candidate value $\hat{Y}'_{444}=512$ is tried. $\hat{Y}'_{01}$ is calculated from the candidate value, and using the previously calculated $\hat{Cb}'_{0.5}$, $\hat{Cr}'_{0.5}$ it is possible to go through the last processing steps, yielding ($\hat{R}$, $\hat{G}$, $\hat{B}$) through the chain ($\hat{Y}'_{01}$, $\hat{Cb}'_{0.5}$, $\hat{Cr}'_{0.5}$)→(inverse color transform)→($\hat{R}'_{01}$, $\hat{G}'_{01}$, $\hat{B}'_{01}$)→ (EOTF)→($\hat{R}_{01}$, $\hat{G}_{01}$, $\hat{B}_{01}$)→(denormalization)→($\hat{R}$, $\hat{G}$, $\hat{B}$). This is now fed into Equation 1 to get the candidate luminance $\hat{Y}$. For a given pixel, if $\hat{Y}<Y_O$, this means that the candidate value $\hat{Y}'_{444}$ was too small, and that the correct luma value must be in the interval [512; 1023]. Likewise if $\hat{Y}>Y_O$, the correct luma value must be in the interval [0; 512]. The process is now repeated, and after ten iterations the interval contains two neighboring values. At this stage, both of the two values are tried, and the one that produces the smallest error $(\hat{Y}-Y_O)^2$ is selected.

Results

Figures 18A, 18B, 18C:
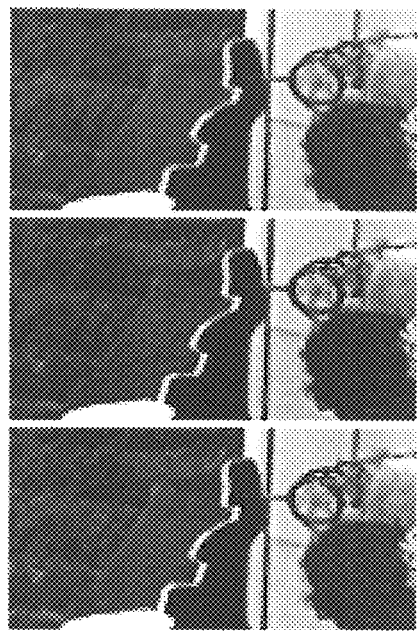
FIGS. 18A-18C illustrate an original 4:4:4 picture (FIG. 18A), a picture following traditional processing 4:2:0 (FIG. 18B) and a picture following proposed processing 4:2:0 (FIG. 18C) in the case of no compression but just down-sampling and upsampling.
Figures 17A, 17B, 17C:
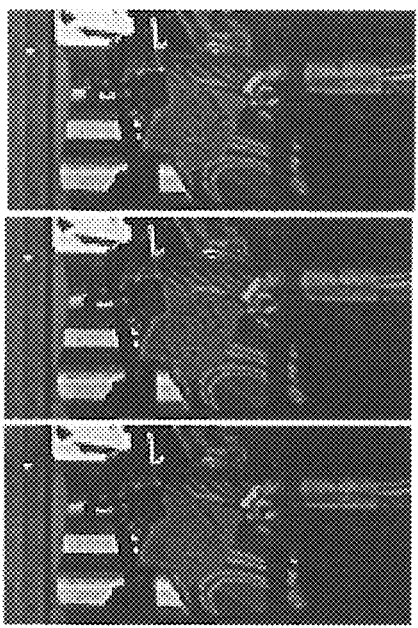
FIGS. 17A-17C illustrate an original 4:4:4 picture (FIG. 17A), a picture following traditional processing 4:2:0 (FIG. 17B) and a picture following proposed processing 4:2:0 (FIG. 17C) in the case of no compression but just down-sampling and upsampling.

We implemented the conventional processing chain and compared this to our chain, which includes the luma adjustment step, but keeps the decoder the same. FIGS. 17A-17C and 18A-18C show results without compression. Here, both the conventional processing chain (FIGS. 17B and 18B) and our processing chain (FIGS. 17C and 18C) converts to Y'Cb'Cr' 4:2:0 and then back to linear RGB. FIGS. 17A and 18A illustrate the original pictures. Total encoding time (color conversion plus HM compression) increases about 3% compared to traditional processing.

For HDR material, no single metric has a role similar to PSNR for SDR content. Instead we report two metrics tPSNR-Y for luminance and deltaE for chrominance. In Table 5 the uncompressed results for BT.709 material in a BT.709 container is shown. Here we see a large increase in luminance quality measured as tPSNR-Y of over 17 dB on average, and over 20 dB on one sequence. Also the deltaE result is improving. Table 6 shows the uncompressed results for BT.709 material or P3 material in a BT.2020 container. Here the gains are less pronounced, since no colors directly on the gamut edge are available, but the tPSNR-Y improvement is still 8 dB on average and over 11 dB on some sequences. The deltaE measure improves marginally. Note that with true BT.2020 material, we expect the gains to be more similar to those in Table 5.

TABLE 5 tPSNR-Y and deltaE increase (dB) for Rec.709 container

| class | sequence | tPSNR-Y | deltaE |
|---|---|---|---|
| class A' | FireEaterClip4000r1 | 13.81 | 2.23 |
| | Tibul2Clip4000r1 | 18.01 | 3.85 |
| | Market3Clip4000r2 | 20.30 | 0.15 |
| | Overall | 17.37 | 2.08 |

TABLE 6 tPSNR-Y and deltaE increase (dB) for BT.2020 container

| class | sequence | tPSNR-Y | deltaE |
|---|---|---|---|
| class A | FireEAterClip4000r1 | 5.88 | 0.73 |
| | Market3Clip4000r2 | 10.17 | 0.95 |
| | Tibul2Clip4000r1 | 7.60 | 0.02 |
| class B | AutoWelding | 11.25 | 0.12 |
| | BikeSparklers | 11.33 | 0.02 |
| class C | ShowGirl2Teaser | 6.28 | 0.05 |
| class D | StEM_MagicHour | 7.22 | 0.03 |
| | stem_WarmNight | 8.53 | 0.04 |
| class G | BallonFestival | 7.71 | 0.05 |
| | Overall | 8.44 | 0.22 |

ANNEX

This Annex investigates color artifacts due to 4:2:0 subsampling. First, an attempt to cross-check is made, but the worst value cannot be reproduced, likely due to a bug in HDRTools that has already been fixed. Next, a search is performed for the worst relative error in luminance arising from 4:2:0 subsampling. It is found that a relative error of 86% (195 Barten steps) can occur even if displayed on a screen limited to 4000 nits. Even if data is restricted to Rec709 and held in a BT.2020 container, an error of 30 Barten steps is possible. For P3 content in a BT.2020 container, an error of 40 Barten steps is possible.

1 Introduction

It has been noted that small changes in color can introduce surprisingly large artifacts when 4:2:0 subsampling is used, even if no compression is happening.

1.1 Cross-Check Discrepancies

This investigation started as a cross-check of m35255 [1], trying to replicate the results on slide 13, reprinted in Table A1 below. The results are from a test image where the left part of the image up to pixel 95 has the color (3000, 0, 100) and the right part, pixel 96 and forward, has the color (3000, 4, 100).

TABLE A1 values of m35255

| 4:2:0 10 bits | 94 | 95 | 96 | 97 | 98 | 99 |
|---|---|---|---|---|---|---|
| EXR | 3000 | 3000 | 3000 | 3000 | 3000 | 3000 |
| RGB | 0 | 0 | 4 | 4 | 4 | 4 |
| in | 100 | 100 | 100 | 100 | 100 | 100 |
| YCbCr | 258 | 258 | 404 | 404 | 404 | 404 |
|  | 650 | 650 | 640 | 640 | 570 | 570 |
|  | 882 | 882 | 870 | 870 | 787 | 787 |
| implied | 258 | 258 | 401 | 404 | 404 | 404 |
| YCbCr | 650 | 649 | 642 | 604 | 570 | 566 |
|  | 882 | 881 | 862 | 828 | 787 | 782 |
| EXR | 3006 | 2958 | 10000 | 5860 | 2998 | 2764 |
| RGB | 0 | 0 | 1.57324 | 2.58008 | 3.99609 | 4.20313 |
| out | 99.1875 | 97.125 | 402.25 | 199 | 100.125 | 92.1875 |

When cross-checking using the same procedures as for the anchors (n14548, [2]) we got the result shown in Table A2. For downsampling, the filters described in Section 2.4.7 of [2] was followed (2 and 3 taps) and for upsampling Section 2.4.8 of [2] was followed (4 tap filters).

TABLE A2 values when trying to crosscheck

| 4:4:4 10 bits | 94 | 95 | 96 | 97 | 98 | 99 |
|---|---|---|---|---|---|---|
| EXR | 3000 | 3000 | 3000 | 3000 | 3000 | 3000 |
| RGB | 0 | 0 | 4 | 4 | 4 | 4 |
| in | 100 | 100 | 100 | 100 | 100 | 100 |
| YCbCr | 258 | 258 | 404 | 404 | 404 | 404 |
| 4:2:0 | 650 |  | 580 |  | 570 |  |
|  | 882 |  | 799 |  | 787 |  |
| YCbCr | 258 | 258 | 404 | 404 | 404 | 404 |
| after | 650 | 616 | 580 | 571 | 570 | 569 |
| upsampling | 882 | 841 | 799 | 788 | 787 | 786 |
| EXR | 3006 | 1551 | 3644 | 3048 | 2998 | 2950 |
| RGB | 0 | 0.0169 | 3.5293 | 3.9531 | 3.9961 | 4.0391 |
| out | 99.1875 | 48.2188 | 122.9375 | 102.2500 | 100.125 | 98.0625 |

As can be seen, this matches really poorly and only pixel nos. 94 and 98 matches, whereas no match is found for pixel nos. 95-97 or 99. However, moving the discontinuity to pixel 97 instead gives a much better match, as shown in Table A3.

TABLE A3 values when moving the discontinuity

| 4:4:4 10 bits | 94 | 95 | 96 | 97 | 98 | 99 |
|---|---|---|---|---|---|---|
| EXR | 3000 | 3000 | 3000 | 3000 | 3000 | 3000 |
| RGB | 0 | 0 | 0 | 4 | 4 | 4 |
| in | 100 | 100 | 100 | 100 | 100 | 100 |
| YCbCr | 258 | 258 | 258 | 404 | 404 | 404 |
| 4:2:0 | 650 |  | 640 |  | 570 |  |
|  | 882 |  | 870 |  | 787 |  |
| YCbCr | 258 | 258 | 258 | 404 | 404 | 404 |
| after | 650 | 649 | 640 | 604 | 570 | 566 |
| upsampling | 882 | 881 | 870 | 828 | 787 | 782 |
| EXR | 3006 | 2958 | 2476 | 5860 | 2998 | 2764 |
| RGB | 0 | 0 | 0.00142 | 2.58008 | 3.99609 | 4.20312 |
| out | 99.1875 | 97.125 | 80.5625 | 199 | 100.125 | 92.1875 |

In Table A3, only pixel no. 96 does not match. That is also the pixel with the strangest values (10000, 1.57, 402.25), the correct answer being (3000, 0, 100) or (3000, 4, 100) depending on where you put the discontinuity.

It seems as if the mismatch in the crosscheck is due to an error that has already been corrected in HDRtools. If reverting to revision 492, we can produce the same values as in m35255 [1]. To confirm that the newer version of HDRtools (revision 573) is correct we have independently implemented the processing chain in Matlab and we get the same results as in Table A3. The reason why we had to move the discontinuity to get a match is probably due to the faulty filtering in revision 492 which has been fixed in the current version.

1.2 Rounding Issue

When implementing the Matlab crosscheck, we realized that the conversion of float to EXR in HDRtools lacks rounding. Instead of rounding the 23 bits of the mantissa to 10 bits, they are just right-shifted, basically replacing a round( ) with a floor( ). This affects the end result. As an example a float of 3007.9 will be converted to 3006.0, even though 3008.0 is a much closer value. To get a match we made the Matlab code emulate the floor( )-type conversion in the current revision of HDRtools (revision 587 of [3]).

1.3 Color Outliers

Note that even if pixel 96 is no longer an extreme outlier, pixel 97 is still quite far from correct: (5860, 2.58, 199) instead of (3000, 4, 100). That raises the question; how bad outliers can 4:2:0 subsampling generate and where does this happen? To answer this question we first have to define what we mean by "bad". We concentrated on the luminance, since the human visual system is more sensitive to changes in luminance than in chrominance. Hence we transformed both the input EXR image and the output EXR image both linear light to XYZ, and formed the difference in Y. To get a relative error we then divided by the Y component of the original. We then wrote a small program maximizing this relative error for pixel 97 over all possible images of the type where the left part is of one color and the right part is the same color plus a small delta of length 4, just as was done in m35255 [1].

Running this program gave the answer that having the color (2142, 0, 138) in the left part and (2142, 4, 138) in the right part gives the largest visible error, as shown in Table A4. The optimization software that looks for the "worst" error is not guaranteed to find the global maximum, hence even worse positions in the color gamut may exist.

TABLE A4 data for the "worst" color for 4:2:0 subsampling

| pixel 97 | RGB value | Y value | Y diff | relative error | Barten steps |
|---|---|---|---|---|---|
| original | 2142 4 138 | 573.5991 | 0 | 0 | 0 |
| RGB 4:4:4 | 2142.6617 3.9750 138.2966 | 573.7735 | 0.1745 | 0.0304% | 0.0691 |
| RGB 4:2:0 | 3993.7333 2.4265 263.6030 | 1066.4311 | 492.8320 | 85.9192% | 195.2710 |

It should be noted that having a red component higher than 2142 would generate an even higher relative error. However, we assumed that RGB values above 4000 would be clipped to 4000 by the monitor, so we believe that the actual on-screen difference would start to diminish if higher values were used.

As can be seen in Table A4, the relative error for RGB 4:4:4 is 0.0304%. To put that in perspective, we compared that with Barten's curve, see FIG. 21 illustrating Barten's curve for contrast sensitivity. A contrast below the curve is not noticeable. Table A5 shows the values used for plotting the curve in FIG. 21.

TABLE A5 values used for plotting the Barten's curve

| Luminance in cd/m$^2$ | Contrast (%) |
|---|---|
| $10^{-3}$ | 13.8294 |
| $10^{-2}$ | 4.5454 |
| $10^{-1}$ | 1.7461 |
| $10^0$ | 0.8507 |
| $10^1$ | 0.5454 |
| $10^2$ | 0.4360 |
| $10^3$ | 0.4027 |
| $10^4$ | 0.3962 |

As can be seen in FIG. 21, the tolerance for relative errors decreases with increased luminance. At 100 nits, an error of 0.44% can be just noticeable, whereas at 1000 nits, an error of 0.40% can be just noticeable. Since 455 nits is right between these, we use the higher value of 0.44%. This gives a Barten step of 0.069, which means it is not noticeable.

For 4:2:0 subsampling, on the other hand, the relative error is 85.92%. This is equivalent to over 195 Barten steps, which should be clearly visible. It therefore seems reasonable to conclude that 4:2:0 subsampling can create clearly visible artifacts, at least together with non-constant luminance and a highly non-linear transfer function as is the case in the anchor generation.

Note that the worst error is right on the border of the color gamut; since the green color is zero, the color (2142, 0, 138) is on the line between the red and green color primaries. This is consistent with what was reported in m35255 [1], which also pointed out colors on the gamut edge as problematic.

1.4 When Input is 709 Data

The data presented in Table A1 was for BT.2020 primaries. If the input data is with Rec709 primaries, but the container is BT.2020, it will not be possible to reach the color gamut boundary. This is due to the fact that the Rec709 gamut triangle is inside the BT.2020 triangle, not touching the gamut boundary, as can be seen in FIG. 22. It is therefore reasonable to assume that the relative error will be smaller.

We have run the optimization software to find the Rec709 color that, after conversion to BT.2020, would result in the largest relative error. The resulting two colors are (0, 0, 50) for the left part of the screen and (2, 3, 49) in the right part. This is presented in Table A6.

TABLE A6 data for the "worst" color for 4:2:0 subsampling if input is Rec709 and container format is BT.2020

| pixel 97 | RGB value | Y value | Y diff | relative error | Barten steps |
|---|---|---|---|---|---|
| original Rec709 color | 2 3 49 | | | | |
| original BT.2020 color | 4.3650 3.4535 44.1810 | 6.1082 | | | |

TABLE A6-continued data for the "worst" color for 4:2:0 subsampling if input is Rec709 and container format is BT.2020

| pixel 97 | RGB value | Y value | Y diff | relative error | Barten steps |
|---|---|---|---|---|---|
| RGB 4:4:4 | 4.3793 3.4293 43.7035 | 6.0672 | 0.0410 | 0.6711% | 1.2305 |
| RGB 4:2:0 | 4.4055 2.9939 63.5135 | 7.2163 | 1.1082 | 18.1422% | 33.2640 |

Here we have used the Barten curve at 10 nits, which equals 0.54%. For RGB 4:4:4 we then get an error that is just noticeable at 1.2305 Barten steps, whereas the error in RGB 4:2:0 equals 33 Barten steps, which should be clearly visible. It is also reasonable that the error is smaller (33 Barten steps vs. 195 Barten steps) since starting out with Rec709 data precludes the color from reaching all parts of the gamut edge of BT.2020.

Notice also how the optimization result has found that the worst error is available near the blue primary. This is likely because the blue Rec709 primary is closest to the BT.2020 gamut edge, as can be seen in FIG. 22.

1.5 When Input is P3 Data

The same test can be carried out for P3 source data contained in a BT.2020 container. The worst colors are then (2.48, 3.32, 4.63) and (3.29, 0, 6.71), as shown in Table A7.

TABLE A7 data for the "worst" color for 4:2:0 subsampling if input is P3 and container format is BT.2020

| pixel 97 | RGB value | Y value | Y diff | relative error | Barten steps |
|---|---|---|---|---|---|
| original P3 color | 3.29 0 6.71 | | | | |
| original BT.2020 color | 2.7993 0.2342 6.5960 | 1.2853 | | | |
| RGB 4:4:4 | 2.8099 0.2304 6.4838 | 1.2788 | 0.0065 | 0.5062% | 0.5951 |
| RGB 4:2:0 | 1.4911 0.3834 3.2402 | 0.8438 | 0.4416 | 34.3530% | 40.38 |

We would assume that the error would be somewhere between that of Rec709 and BT.2020, and this is also the case, we now get an error equivalent of 40.38 Barten steps. Note that since the Barten value changes, it is important to include it in the loop when searching for the worst value. We have used the Barten value for 1 cd/m², which equals 0.85%.

1.6 Conclusion

This Annex has investigated the error in luminance due to 4:2:0 subsampling. Although we have not been able to match the worst outlier from m35255 [1], the worst case errors are still significant, reaching almost 200 Barten steps for general data. Even if the source data is constrained to Rec709 and put into a BT.2020 container, the error is still significant, over 30 Barten steps, and for P3 data in a BT.2020 container, over 40 Barten steps.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] International Organization for Standardization, ISO/IEC JTC1/SC29/WG11, Coding of moving pictures and audio, MPEG2013/M35255, October 2014, Strasbourg, France, Francois et al., About using a BT.2020 container for BT.709 content
[2] International Organization for Standardization, ISO/IEC JTC1/SC29WG11, Coding of moving pictures and audio, MPEG2014/N14548, July 2014, Sapporo, Japan, Luthra et al., Test sequences and anchor generation for HDR and Wide Gamut Content Distribution
[3] https://wg11.sc29.org/svn/repos/Explorations/XYZ/HDRTools/branches/0.9-dev
[4] International Organization for Standardization, ISO/IEC JTC1/SC29WG11, Coding of moving pictures and audio, MPEG2014/N15083, February 2015, Geneva, Switzerland, Luthra et al., Call for Evidence (CfE) for HDR and WCG Video Coding

The invention claimed is:

1. A method of pre-processing a pixel in a picture, said method comprising:
   obtaining an original linear luminance component value of said pixel in a third color space, the third color space comprising a linear XYZ color space, the original linear luminance component value being determined based on a linear color of said pixel in a first linear color space; and
   deriving a non-linear luma component value in a second non-linear color space for said pixel based on a first non-linear chroma component value in said second color space, a second non-linear chroma component value in said second color space and said original linear luminance component value in said third color space;
   wherein deriving said non-linear luma component value comprises deriving a non-linear luma component value in said second color space that minimizes a difference between said original linear luminance component value in said third color space and a linear luminance component value in said third color space determined based on said non-linear luma component value in said second color space, said first non-linear chroma component value in said second color space and said second non-linear chroma component value in said second color space.

2. The method according to claim 1, wherein obtaining said original linear luminance component value comprises determining said original linear luminance component value in said third color space based on said linear color in said first color space.

3. The method according to claim 1, wherein deriving said non-linear luma component value comprises deriving said non-linear luma component value in said second color space based on a subsampled first non-linear chroma component value in said second color space, a subsampled second non-linear chroma component value in said second color space and said original linear luminance component value in said third color space.

4. The method according to claim 3, further comprising:
applying a first transfer function to said linear color in said first color space to get a non-linear color in said first color space;
applying a first color transform to said non-linear color in said first color space to get a non-linear color in said second color space, wherein said non-linear color in said second color space comprises an initial first non-linear chroma component value and an initial second non-linear chroma component value; and
subsampling said initial first non-linear chroma component value in said second color space and said initial second non-linear chroma component value in said second color space to get said subsampled first non-linear chroma component value in said second color space and said subsampled second non-linear chroma component value in said second color space.

5. The method according to claim 3, further comprising:
(i) upsampling said subsampled first non-linear chroma component value in said second color space and said subsampled second non-linear chroma component value in said second color space to get an upsampled first non-linear chroma component value in said second color space and an upsampled second non-linear chroma component value in said second color space;
(ii) applying a second color transform to a candidate non-linear luma component value in said second color space, said upsampled first non-linear chroma component value in said second color space and said upsampled second non-linear chroma component value in said second color space to get a non-linear color in said first color space;
(iii) applying a second transfer function to said non-linear color in said first color space to get a linear color in said first color space; and
(iv) applying a third color transform to said linear color in said first color space to get a linear luminance component value in said third color space, wherein deriving said non-linear luma component value comprises deriving said non-linear luma component value based on a comparison of said original linear luminance component value in said third color space and said linear luminance component value in said third color space.

6. The method according to claim 5, wherein deriving said non-linear luma component value comprises selecting a candidate non-linear luma component value in said second color space that reduces a difference between said original linear luminance component value in said third color space and said linear luminance component value in said third color space.

7. The method according to claim 6, further comprising performing steps (ii) to (iv) for different candidate non-linear luma component values in said second color space, wherein selecting said candidate non-linear luma component value comprises selecting the candidate non-linear luma component value among said different candidate non-linear luma component values in said second color space that results in a smallest difference between said original linear luminance component value in said third color space and said linear luminance component value in said third color space.

8. The method according to claim 5, further comprising performing a binary search to select a candidate non-linear luma component value in said second color space that minimizes a difference between said original linear luminance component value in said third color space and said linear luminance component value in said third color space.

9. The method according to claim 3, further comprising upsampling said subsampled first non-linear chroma component value in said second color space and said subsampled second non-linear chroma component value in said second color space to get an upsampled first non-linear chroma component value in said second color space and an upsampled second non-linear chroma component value in said second color space, wherein deriving said non-linear luma component value comprises retrieving said non-linear luma component value in said second color space from a look-up table using said original linear luminance component value in said third color space, or a non-linear version thereof, said upsampled first non-linear chroma component value in said second color space and said upsampled second non-linear chroma component value in said second color space, or quantized versions thereof, as input to said look-up table.

10. The method according to claim 9, further comprising applying said first transfer function to said original linear luminance component value in said third color space to get an original non-linear luminance component value in said third color space, wherein deriving said non-linear luma component value comprises retrieving said non-linear luma component value in said second color space from said look-up table using said original non-linear luminance component value in said third color space, said upsampled first non-linear chroma component value in said second color space and said upsampled second non-linear chroma component value in said second color space, or said quantized versions thereof, as input to said look-up table.

11. The method according to claim 9, wherein said look-up table comprises, for each combination of said original linear luminance component value in said third color space, or said non-linear version thereof, said upsampled first non-linear chroma component value in said second color space and said upsampled second non-linear chroma component value in said second color space, or said quantized versions thereof, an optimal non-linear luma component value in said second color space that minimizes a difference between said original linear luminance component value in said third color space and a linear luminance component value in said third color space determined based on said optimal non-linear luma component value in said second color space, said subsampled first non-linear chroma component value in said second color space and said subsampled second non-linear chroma component value in said second color space.

12. The method of claim 1, further comprising:
encoding said non-linear luma component value, a subsampled first non-linear chroma component value in said second color space and a subsampled second non-linear chroma component value in said second color space.

13. A device for pre-processing a pixel in a picture, wherein said device comprises:
a processor; and
a memory coupled to said processor;
wherein:
said processor is configured to obtain an original linear luminance component value of said pixel in a third color space, the third color space comprising a linear XYZ color space, the original linear luminance component value being determined based on a linear color of said pixel in a first linear color space; and
said processor is configured to derive a non-linear luma component value in a second non-linear color space for said pixel based on a first non-linear chroma component value in said second color space, a second non-linear chroma component value in said second color space and said original linear luminance component value in said third color space;

wherein said processor is configured to derive a non-linear luma component value in said second color space that minimizes a difference between said original linear luminance component value in said third color space and a linear luminance component value in said third color space determined based on said non-linear luma component value in said second color space, said first non-linear chroma component value in said second color space and said second non-linear chroma component value in said second color space.

14. The device according to claim 13, wherein said processor is configured to determine said original linear luminance component value in said third color space based on said linear color in said first color space.

15. The device according to claim 13, wherein said processor is configured to derive said non-linear luma component value in said second color space based on a subsampled first non-linear chroma component value in said second color space, a subsampled second non-linear chroma component value in said second color space and said original linear luminance component value in said third color space.

16. The device according to claim 15, wherein said processor is configured to apply a first transfer function to said original linear color in said first color space to get a non-linear color in said first color space;

said processor is configured to apply a first color transform to said non-linear color in said first color space to get a non-linear color in said second color space, wherein said non-linear color in said second color space comprises an initial first non-linear chroma component value and an initial second non-linear chroma component value; and said processor is configured to subsample said initial first non-linear chroma component value in said second color space and said initial second non-linear chroma component value in said second color space to get said subsampled first non-linear chroma component value in said second color space and said subsampled second non-linear chroma component value in said second color space.

17. The device according to claim 15, wherein:

said processor is configured to upsample said subsampled first non-linear chroma component value in said second color space and said subsampled second non-linear chroma component value in said second color space to get an upsampled first non-linear chroma component value in said second color space and an upsampled second non-linear chroma component value in said second color space;

said processor is configured to apply a second color transform to a candidate non-linear luma component value in said second color space, said upsampled first non-linear chroma component value in said second color space and said upsampled second non-linear chroma component value in said second color space to get a non-linear color in said first color space;

said processor is configured to apply a second transfer function to said non-linear color in said first color space to get a linear color in said first color space;

said processor is configured to apply a third color transform to said linear color in said first color space to get a linear luminance component value in said third color space; and said processor is configured to derive said non-linear luma component value based on a comparison of said original linear luminance component value in said third color space and said linear luminance component value in said third color space.

18. The device according to claim 17, wherein said processor is configured to select a candidate non-linear luma component value in said second color space that reduces a difference between said original linear luminance component value in said third color space and said linear luminance component value in said third color space.

19. The device according to claim 18, wherein:

said processor is configured to perform application of said second color transform to a candidate non-linear luma component value in said second color space, said upsampled first non-linear chroma component value in said second color space and said upsampled second non-linear chroma component value in said second color space, application of said second transfer function to said non-linear color in said first color space and application of said third color transform to said linear color in said first color space for different candidate non-linear luma component values in said second color space; and said processor is configured to select the candidate non-linear luma component value among said different candidate non-linear luma component values in said second color space that results in a smallest difference between said original linear luminance component value in said third color space and said linear luminance component value in said third color space.

20. The device according to claim 17, wherein said processor is configured to perform a binary search to select a candidate non-linear luma component value in said second color space that minimizes a difference between said original linear luminance component value in said third color space and said linear luminance component value in said third color space.

21. The device according to claim 15, wherein:

said processor is configured to upsample said subsampled first non-linear chroma component value in said second color space and said subsampled second non-linear chroma component value in said second color space to get an upsampled first non-linear chroma component value in said second color space and an upsampled second non-linear chroma component value in said second color space; and said processor is configured to retrieve said non-linear luma component value in said second color space from a look-up table using said original linear luminance component value in said third color space, or a non-linear version thereof, said upsampled first non-linear chroma component value in said second color space and said upsampled second non-linear chroma component value in said second color space, or quantized versions thereof, as input to said look-up table.

22. The device according to claim 21, wherein:

said processor is configured to apply said first transfer function to said original linear luminance component value in said third color space to get an original non-linear luminance component value in said third color space; and said processor is configured to retrieve said non-linear luma component value in said second color space from said look-up table using said original non-linear luminance component value in said third color space, said upsampled first non-linear chroma component value in said second color space and said upsampled second non-linear chroma component value in said second color space, or said quantized versions thereof, as input to said look-up table.

23. The device according to claim 22, wherein:
said processor is configured to obtain said original linear luminance component value of said pixel in said third color space; and
said processor is configured to derive said non-linear luma component value in said second color space for said pixel.

24. A device for encoding a pixel in a picture, said device comprises:
a processor; and
a nontransitory memory comprising instructions executable by said processor, wherein
said processor is configured to obtain an original linear luminance component value of said pixel in a third color space, the third color space comprising a linear XYZ color space, the original linear luminance component value being determined based on a linear color of said pixel in a first linear color space;
said processor is configured to derive a non-linear luma component value in a second non-linear color space for said pixel based on a first non-linear chroma component value in said second color space, a second non-linear chroma component value in said second color space and said original linear luminance component value in said third color space; and
said processor is configured to encode said non-linear luma component value, said first non-linear chroma component value and said second non-linear chroma component value;
wherein said processor is configured to derive a non-linear luma component value in said second color space that minimizes a difference between said original linear luminance component value in said third color space and a linear luminance component value in said third color space determined based on said non-linear luma component value in said second color space, said first non-linear chroma component value in said second color space and said second non-linear chroma component value in said second color space.

25. A device for encoding a pixel in a picture, said device comprises:
a determining unit for obtaining an original linear luminance component value of said pixel in a third color space, the third color space comprising a linear XYZ color space, the original linear luminance component value being determined based on a linear color of said pixel in a first linear color space;
a deriver for deriving a non-linear luma component value in a second non-linear color space for said pixel based on a first non-linear chroma component value in said second color space, a second non-linear chroma component value in said second color space and said original linear luminance component value in said third color space; and
an encoder for encoding said non-linear luma component value, said first non-linear chroma component value and said second non-linear chroma component value;
wherein deriving said non-linear luma component value comprises deriving a non-linear luma component value in said second color space that minimizes a difference between said original linear luminance component value in said third color space and a linear luminance component value in said third color space determined based on said non-linear luma component value in said second color space, said first non-linear chroma component value in said second color space and said second non-linear chroma component value in said second color space.

* * * * *

UNITED STATES PATENT AND TRADEMARK OFFICE
CERTIFICATE OF CORRECTION

PATENT NO.        : 9,654,803 B2                    Page 1 of 2
APPLICATION NO.   : 15/051488
DATED             : May 16, 2017
INVENTOR(S)       : Ström et al.

It is certified that error appears in the above-identified patent and that said Letters Patent is hereby corrected as shown below:

On the Title Page

In Item (74), under "Attorney, Agent, or Firm", in Column 2, Line 1, delete "Bigel, P.A." and insert -- Bigel Sibley & Sajovec, P.A. --, therefor.

In the Specification

In Column 1, Line 9, delete "62/115,689," and insert -- 62/115,679, --, therefor.

In Column 1, Line 10, delete "content of which" and insert -- content of --, therefor.

In Column 5, Line 37, delete "YCBCR, Y'CBCR or Y'CB'CR)" and
insert -- $YC_BC_R$, $Y'C_BC_R$ or $Y'C_B'C_R'$ ) --, therefor.

In Column 14, Line 57, delete "(Y', Cb', Cr)." and insert -- (Y', Cb', Cr'). --, therefor.

In Column 16, Line 21, delete "$X=0.636958 \times R+0.144617 \times +0.168881 \times B$"
and insert -- $X = 0.636958 \times R + 0.144617 \times G + 0.168881 \times B$ --, therefor.

In Column 18, Line 55, delete "1.0%" and insert -- 1.0 --, therefor.

In Column 18, Line 65, delete "L=10000*((max(c.^(1/m)–c1, 0)./c2–c3*c.^(1/m))).^ (1/n));" and
insert -- L=10000*((max(c.^(1/m)–c1, 0)./c2–c3*c.^(1/m))).^ (1/n)). --, therefor.

In Column 19, Line 41, delete "B1" and insert -- B1. --, therefor.

In Column 19, Line 45, delete "Y'" and insert -- Y'. --, therefor.

In Column 24, Line 15, delete "space. the" and insert -- space. The --, therefor.

Signed and Sealed this
Fifth Day of December, 2017

Joseph Matal
*Performing the Functions and Duties of the*
*Under Secretary of Commerce for Intellectual Property and*
*Director of the United States Patent and Trademark Office*

In Column 25, Line 11, delete "devices" and insert -- devices. --, therefor.

In Column 30, Line 29, delete "100)" and insert -- 100). --, therefor.

In Column 31, Line 54, delete "Cr'0.5," and insert -- Cb'0.5, --, therefor.

In Column 31, Line 58, delete "($\hat{Y}$'0.1," and insert -- ($\hat{Y}$'01, --, therefor.

In Column 38, Line 15, delete "JTC1/SC29WG11," and insert -- JTC1/SC29/WG11, --, therefor.

In Column 38, Line 23, delete "JTC1/SC29WG11," and insert -- JTC1/SC29/WG11, --, therefor.

In the Claims

In Column 41, Line 28, in Claim 16, delete "wherein" and insert -- wherein: --, therefor.